(12) United States Patent
Sansottera et al.

(10) Patent No.: US 10,817,973 B2
(45) Date of Patent: *Oct. 27, 2020

(54) TASK ASSEMBLY FOR SIMD PROCESSING

(71) Applicant: Imagination Technologies Limited, Kings Langley (GB)

(72) Inventors: Andrea Sansottera, Haywards Heath (GB); Xile Yang, Rickmansworth (GB); John Howson, St. Albans (GB); Jonathan Redshaw, St. Albans (GB)

(73) Assignee: Imagination Technologies Limited, Kings Langley (GB)

( * ) Notice: Subject to any disclaimer, the term of this patent is extended or adjusted under 35 U.S.C. 154(b) by 0 days.

This patent is subject to a terminal disclaimer.

(21) Appl. No.: 16/282,680

(22) Filed: Feb. 22, 2019

(65) Prior Publication Data

US 2019/0188823 A1 Jun. 20, 2019

Related U.S. Application Data

(63) Continuation of application No. 15/452,569, filed on Mar. 7, 2017, now Pat. No. 10,255,653.

(30) Foreign Application Priority Data

Mar. 7, 2016 (GB) .................................. 1603869.7

(51) Int. Cl.
*G06T 1/60* (2006.01)
*G06T 1/20* (2006.01)
(Continued)

(52) U.S. Cl.
CPC .................. *G06T 1/20* (2013.01); *G06T 1/60* (2013.01); *G06T 15/005* (2013.01); *G06T 15/10* (2013.01);
(Continued)

(58) Field of Classification Search
CPC ......... G06T 1/20; G06T 1/60; G06T 2210/52; G06F 11/001; G06F 9/3851; G06F 9/3887; G06F 11/1008
See application file for complete search history.

(56) References Cited

U.S. PATENT DOCUMENTS

2007/0030278 A1* 2/2007 Prokopenko et al. .... G06T 1/20
345/506
2007/0091089 A1* 4/2007 Jiao ....................... G06T 15/005
345/426

(Continued)

FOREIGN PATENT DOCUMENTS

GB 2540227 A 1/2017

*Primary Examiner* — Samantha (Yuehan) Wang
(74) *Attorney, Agent, or Firm* — Potomac Law Group, PLLC; Vincent M DeLuca

(57) ABSTRACT

A cache system in a graphics processing system stores graphics data items for use in rendering primitives. It is determined whether graphics data items relating to primitives to be rendered are present in the cache, and if not then computation instances for generating the graphics data items are created. Computation instances are allocated to tasks using a task assembly unit which stores task entries for respective tasks. The task entries indicate which computation instances have been allocated to the respective tasks. The task entries are associated with characteristics of computation instances which can be allocated to the respective tasks. A computation instance to be executed is allocated to a task based on the characteristics of the computation instance. SIMD processing logic executes computation instances of a task outputted from the task assembly unit to thereby determine graphics data items, which can be used to render the primitives.

20 Claims, 12 Drawing Sheets

(51) Int. Cl.
  *G06T 15/00* (2011.01)
  *G06T 15/10* (2011.01)
  *G06T 15/80* (2011.01)
  *G06T 17/20* (2006.01)
(52) U.S. Cl.
  CPC ............ *G06T 15/80* (2013.01); *G06T 17/20* (2013.01); *G06T 2210/52* (2013.01)

(56) References Cited

U.S. PATENT DOCUMENTS

| | | |
|---|---|---|
| 2009/0189909 A1 | 7/2009 | Jiao et al. |
| 2010/0079454 A1* | 4/2010 | Legakis .................... G06T 1/20 345/423 |
| 2015/0135186 A1 | 5/2015 | Lin et al. |
| 2017/0148203 A1* | 5/2017 | Hakura et al. .......... G06T 15/00 |

* cited by examiner

| Task dependency unit |||||
|---|---|---|---|---|
| State | VS | HS | DS | GS |
| A | 0 | - | - | - |
| B | 1 | - | - | - |
| C | 4 | 3 | 2 | - |

| o0 | o1 | ... | o31 | i0 | i1 | ... | i63 | 0:0 | 0:1 | ... | 0:32 | 1:0 | 1:1 | ... | 31:32 |

Instance outputs — Task inputs — Instance input indexes to task inputs

1200

| Task | Type | Inputs per instance | Ref 0 | Ref 1 | ... | Ref 31 | Description |
|------|------|---------------------|-------|-------|-----|--------|-------------|
| 0 | HS | 3 | 6991 | 1321 | ... | 43 | Outputs |
|  |  |  | 11 | 231 | ... | 55 | Input 0 |
|  |  |  | 44 | 555 | ... | 4411 | Input 1 |
|  |  |  | 455 | 1114 | ... | 4343 | Input 2 |
| 1 | VS | 0 | 11 | 555 | ... | 4411 | Outputs |
| 2 | VS |  | 1114 | 774 | ... | 455 | Outputs |
| 3 | GS | 1 | 545 | 156 | ... | 7565 | Outputs |
|  |  |  | 886 | 7647 | ... | 1331 | Input 0 |

1302

| Task | Type | Output 0 | Output 1 | ... | Output 31 | HS Ref 0 | HS Ref 1 | ... | HS Ref 31 |
|---|---|---|---|---|---|---|---|---|---|
| 0 | HS | 6991 | 1321 | ... | 43 | - | - | - | - |
| 1 | DS | 5312 | 1212 | ... | 233 | 6991 | 6991 | ... | 6991 |
| 2 | DS | 512 | 444 | ... | 555 | 6991 | 1321 | ... | 43 |
| 3 | GS | 783 | | | | - | - | - | - |

1304

| Primitive (HS/ GS LUT Entry) | Vertex 0 (VS LUT Entry) | Vertex 1 (VS LUT Entry) | ... | Vertex 31 (VS LUT Entry) | Task Ref Count |
|---|---|---|---|---|---|
| 6991 | 1231 | 55 | ... | 7811 | 2 |
| 1321 | 5312 | 1212 | ... | 55 | 2 |
| 43 | 7811 | 766 | ... | 124 | 1 |
| 783 | 144 | - | ... | - | 1 |

FIGURE 13

TASK ASSEMBLY FOR SIMD PROCESSING

BACKGROUND

Graphics processing systems are typically configured to receive graphics data, e.g. from an application running on a computer system, and to render the graphics data to provide a rendering output. For example, the graphics data provided to a graphics processing system may describe geometry within a three dimensional (3D) scene to be rendered, and the rendering output may be a rendered image of the scene. Some graphics processing systems (which may be referred to as "tile-based" graphics processing systems) use a rendering space which is subdivided into a plurality of tiles. The "tiles" are regions of the rendering space, and may have any suitable shape, but are typically rectangular (where the term "rectangular" includes square). As is known in the art, there are many benefits to subdividing the rendering space into tiles. For example, subdividing the rendering space into tiles allows an image to be rendered in a tile-by-tile manner (i.e. a rendering process is performed for each of the tiles), wherein graphics data for a tile can be temporarily stored "on-chip" during the rendering of the tile, thereby reducing the amount of data transferred between a system memory and a chip on which a graphics processing unit (GPU) of the graphics processing system is implemented.

Tile-based graphics processing systems typically operate in two phases: a geometry processing phase and a rasterisation phase. In the geometry processing phase, the graphics data for a render is analysed to determine, for each of the tiles, which graphics data items are present within that tile. Then in the rasterisation phase, a tile can be rendered by processing those graphics data items which are determined to be present within that tile (without needing to process graphics data items which were determined in the geometry processing phase to not be present within the particular tile).

FIG. 1 shows an example of a tile-based graphics processing system 100. The system 100 comprises a memory 102, geometry processing logic 104 and rasterisation logic 106. The geometry processing logic 104 and the rasterisation logic 106 may be implemented on a GPU and may share some processing resources, as is known in the art. The geometry processing logic 104 comprises a geometry fetch unit 108, geometry transform logic 110, a cull/clip unit 112 and a tiling unit 114. The rasterisation logic 106 comprises a parameter fetch unit 116, a hidden surface removal (HSR) unit 118 and a texturing/shading unit 120. The memory 102 may be implemented as one or more physical blocks of memory, and includes a graphics memory 122, a transformed parameter memory 124, a control stream memory 126 and a frame buffer 128.

The geometry processing logic 104 performs the geometry processing phase, in which the geometry fetch unit 108 fetches geometry data from the graphics memory 122 and passes the fetched data to the transform logic 110. The geometry data comprises graphics data items which describe geometry to be rendered. For example, the graphics data items may represent geometric shapes, which describe surfaces of structures in the scene, and which are referred to as "primitives". A common primitive shape is a triangle, but primitives may be other 2D shapes and may be lines or points also. Objects can be composed of one or more such primitives. Objects can be composed of many thousands, or even millions of such primitives. Scenes typically contain many objects. Some of the graphics data items may be control points which describe a patch to be tessellated to generate a plurality of tessellated primitives.

The transform logic 110 transforms the geometry data into the rendering space and may apply lighting/attribute processing as is known in the art. The resulting data is passed to the cull/clip unit 112 which culls and/or clips any geometry which falls outside of a viewing frustum. The resulting transformed geometric data items (e.g. primitives) are provided to the tiling unit 114, and are also provided to the memory 102 for storage in the transformed parameter memory 124. The tiling unit 114 generates control stream data for each of the tiles of the rendering space, wherein the control stream data for a tile includes identifiers of transformed primitives which are to be used for rendering the tile, i.e. transformed primitives which are positioned at least partially within the tile. The control stream data for a tile may be referred to as a "display list" or an "object list" for the tile. The control stream data for the tiles is provided to the memory 102 for storage in the control stream memory 126. Therefore, following the geometry processing phase, the transformed primitives to be rendered are stored in the transformed parameter memory 124 and the control stream data indicating which of the transformed primitives are present in each of the tiles is stored in the control stream memory 126.

In the rasterisation phase, the rasterisation logic 106 renders the primitives in a tile-by-tile manner. The parameter fetch unit 116 receives the control stream data for a tile, and fetches the indicated transformed primitives from the transformed parameter memory 124, as indicated by the control stream data for the tile. The fetched transformed primitives are provided to the hidden surface removal (HSR) unit 118 which removes primitive fragments which are hidden (e.g. hidden by other primitive fragments). Methods of performing hidden surface removal are known in the art. The term "fragment" refers to a sample of a primitive at a sampling point, which is to be processed to render pixels of an image. In some examples, there may be a one to one mapping of fragments to pixels. However, in other examples there may be more fragments than pixels, and this oversampling can allow for higher quality rendering of pixel values, e.g. by facilitating anti-aliasing and other filtering that may be applied to multiple fragments for rendering each of the pixel values. Primitives which are not removed by the HSR unit 118 are provided to the texturing/shading unit 120, which applies texturing and/or shading to primitive fragments. Although it is not shown in FIG. 1, the texturing/shading unit 120 may receive texture data from the memory 102 in order to apply texturing to the primitive fragments, as is known in the art. The texturing/shading unit 120 may apply further processing to the primitive fragments (e.g. alpha blending and other processes), as is known in the art in order to determine rendered pixel values of an image. The rasterisation phase is performed for each of the tiles, such that the whole image can be rendered with pixel values for the whole image being determined. The rendered pixel values are provided to the memory 102 for storage in the frame buffer 128. The rendered image can then be used in any suitable manner, e.g. displayed on a display or stored in memory or transmitted to another device, etc.

The amount of geometry data used to represent scenes tends to increase as the complexity of computer graphics applications (e.g. game applications) increases. This means that in the system of FIG. 1, the amount of transformed geometry data which is provided from the geometry processing logic 104 to the memory 102 and stored in the transformed parameter memory 124 increases. This transfer of data from the geometry processing logic 104 (which is typically implemented "on-chip") to the memory 102 (which is typically implemented "off-chip" as system memory) can be a relatively slow process (compared to other processes involved in rendering the geometry data) and can consume large amounts of the memory 102.

Therefore, as described in UK Patent Number GB2458488, some tile-based graphics processing systems can use "untransformed display lists", such that the control stream data for a tile includes indications to the input geometry data, i.e. the untransformed geometry data rather than the transformed geometry data. This means that the transformed geometry data does not need to be provided from the geometry processing logic to the system memory, or stored in the system memory. These systems implement a transform unit in the rasterisation logic because the geometry data fetched by the rasterisation logic is untransformed, but in some scenarios the benefits of avoiding the delay and memory usage of transferring the transformed primitives to the system memory and storing them in the system memory may outweigh the processing costs of performing a transformation in the rasterisation phase.

FIG. 2 shows an example of a system 200 which uses untransformed display lists, similar to that described in GB2458488. The system 200 is similar to the system 100 shown in FIG. 1, and comprises a memory 202, geometry processing logic 204 and rasterisation logic 206. The geometry processing logic 204 and the rasterisation logic 206 may be implemented on a GPU and may share some processing resources, as is known in the art. The geometry processing logic 204 comprises a geometry data fetch unit 208, geometry transform logic 210, a cull/clip unit 212 and a tiling unit 214. The rasterisation logic 206 comprises a fetch unit 216, rasterisation transform logic 230, a HSR unit 218 and a texturing/shading unit 220. The memory 202 may be implemented as one or more physical blocks of memory, and includes a graphics memory 222, a control stream memory 226 and a frame buffer 228.

The geometry processing logic 204 performs the geometry processing phase, in which the geometry data fetch unit 208 fetches geometry data from the graphics memory 222 and passes the fetched data to the transform logic 210. The fetch unit 208 might fetch only data used to compute position of the graphics data items (e.g. primitives) because other data of the graphics data items (e.g. colour data or texture data to be applied during rendering to the graphics data items, etc.) is not needed by the geometry processing logic 204. This is different to the system 100 in which all of the data for graphics data items is fetched by the fetch unit 108. The transform logic 210 transforms the position data of the graphics data items into the rendering space, and the resulting data is passed to the cull/clip unit 212 which culls and/or clips any graphics data items which fall outside of a viewing frustum. The tiling unit 214 generates control stream data for each of the tiles of the rendering space, wherein the control stream data for a tile includes identifiers of graphics data items which are to be used for rendering the tile, e.g. primitives which, when transformed, are positioned at least partially within the tile. The identifiers in the control stream data identify input graphics data items, i.e. graphics data items stored in the graphics memory 222. This is different to the system 100 shown in FIG. 1 in which the identifiers in the control stream data identify transformed primitives stored in the transformed parameter memory 124. The control stream data for the tiles is provided to the memory 202 for storage in the control stream memory 226.

In the rasterisation phase, the fetch unit 216 of the rasterisation logic 206 receives the control stream data for a tile from the control stream memory 226, and fetches the indicated input graphics data items from the graphics memory 222, as indicated by the control stream data for the tile. The input graphics data items are untransformed. The transform logic 230 transforms the fetched graphics data items into the rendering space. The transformed graphics data items are provided to the HSR unit 218 which performs HSR to remove primitive fragments which are hidden. The texturing and shading unit 220 then performs processing such as texturing and/or shading to primitive fragments which are not removed by the HSR unit 218. The HSR unit 218 and the texturing and shading unit 220 operate in a similar manner to the corresponding units 118 and 120 of the system 100 shown in FIG. 1 and described above for rendering primitives. The resulting rendered pixel values are provided to the memory 202 for storage in the frame buffer 228 and can subsequently be used, e.g. displayed on a display or stored in memory or transmitted to another device, etc.

The previous patent GB2458488 describes an optimization for the rasterisation phase in which lighting or attribute processing is deferred until after hidden surface removal has been performed. In this optimization, two transform units are implemented in the rasterisation phase: a first transform unit implemented prior to the HSR unit which transforms only "position data" of primitives (i.e. data for use in computing the position of the primitives), and a second transform unit implemented after the HSR unit which performs lighting or attribute processing for primitives which pass the depth tests of the HSR unit. In this way, non-position attributes of primitives are computed only for primitives which are not culled by the HSR unit.

The previous patent GB2458488 describes a further optimization in which position data for primitives is transformed in the geometry processing phase and then stored in a parameter buffer. The position data for primitives can then be fetched during the rasterisation phase and used by the HSR unit and other processing units. The non-position attribute data for the primitives is fetched from memory and transformed for use by the HSR unit and the other processing units. This optimization avoids the need to re-compute the transformed position data for primitives in the rasterisation phase.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

There is provided a graphics processing system configured to render primitives, the graphics processing system comprising:
  a cache system configured to:
    store, in a cache, graphics data items for use in rendering primitives; and
    determine whether graphics data items relating to primitives to be processed for rendering are present in the cache;
  a task assembly unit configured to:
    store a plurality of task entries for respective tasks to which computation instances can be allocated, the computation instances being for generating graphics data items which are determined by the cache system as being not present in the cache, wherein the task entries indicate which computation instances have been allocated to the respective tasks, and wherein the task entries are associated with characteristics of computation instances which can be allocated to the respective tasks;

allocate, to a task, a computation instance to be executed, based on the characteristics of the computation instance; and output one or more tasks for execution;

SIMD processing logic configured to execute, in a SIMD manner, computation instances of a task outputted from the task assembly unit to thereby determine graphics data items for storage in the cache; and primitive processing logic configured to render primitives using graphics data items stored in the cache.

There is provided a method of processing primitives in a graphics processing system, the method comprising: storing, in a cache of the graphics processing system, graphics data items for use in rendering primitives; determining whether graphics data items relating to primitives to be processed for rendering are present in the cache; storing, in a task assembly unit of the graphics processing system, a plurality of task entries for respective tasks to which computation instances can be allocated, the computation instances being for generating graphics data items which are determined as being not present in the cache, wherein the task entries indicate which computation instances have been allocated to the respective tasks, and wherein the task entries are associated with characteristics of computation instances which can be allocated to the respective tasks; allocating, to a task, a computation instance to be executed, based on the characteristics of the computation instance; outputting one or more tasks for execution; executing, in a SIMD manner, computation instances of an outputted task to thereby determine graphics data items for storage in the cache; and rendering primitives using graphics data items stored in the cache.

Computer readable code may be provided which is adapted to perform the steps of the any of the methods described herein when the code is run on a computer. The computer readable code may be encoded on a computer readable storage medium.

Graphics processing systems described herein may be embodied in hardware on an integrated circuit. There is also provided a method of manufacturing, at an integrated circuit manufacturing system, a graphics processing system according to any of the examples described herein. An integrated circuit definition dataset may also be provided that, when processed in an integrated circuit manufacturing system, configures the system to manufacture a graphics processing system according to any of the examples described herein. The integrated circuit definition dataset may be stored on a computer readable storage medium.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which:

FIG. 13 illustrates a task table and a primitive table for storing input and output references for computation instances of tasks;

Figure 1:
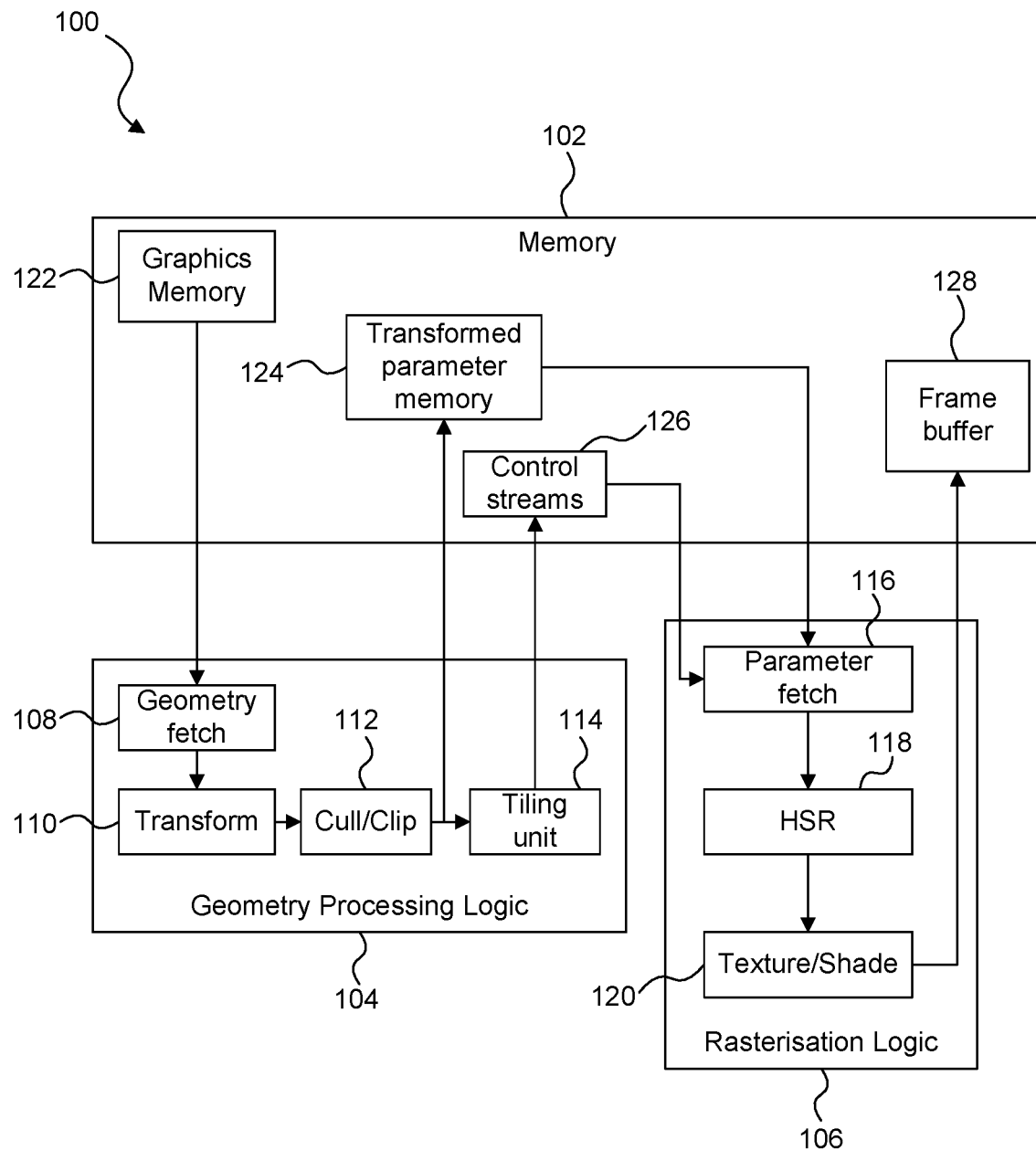
FIG. 1 shows an example of a first prior art graphics processing system which uses transformed display lists.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

Embodiments will now be described by way of example only.

The system 200 described above is well-suited for processing graphics data items, such as primitives, which do not generate further primitives as they are rendered. However, the processing of many input graphics data items may result in the generation of one or more sub-primitives. The term "sub-primitive" is used herein to refer to a primitive which is generated by processing input graphics data items. Therefore, sub-primitives are not stored in the graphics memory 222, but are generated from the input graphics data items stored in the graphics memory 222. For example, if the input graphics data items are control points describing a patch to be tessellated, then the tessellation of the control points can produce many sub-primitives (e.g. two, tens, hundreds or thousands of primitives may be derived). Furthermore, other operations such as vertex shading, domain shading, geometry shading and clipping may be performed on graphics data items and may also split primitives into multiple sub-primitives. Since the system 200 uses control stream data which includes identifiers of input graphics data items stored in the graphics memory 222, the processing stages implemented to determine (at least the position data for) sub-primitives from the input graphics data items need to be performed in both the geometry processing phase and the rasterisation phase in system 200 for input graphics data items which are not culled in the geometry processing phase. Therefore some processing is duplicated in relation to the processing stages for generating sub-primitives.

A number of different operations may be performed for deriving primitives to be rendered from input graphics data items. Some examples of operations which may be performed are vertex shading, hull shading, domain shading and geometry shading. The combination of an operation, and the graphics data item that it operates on, form a computation instance (e.g. a vertex shader instance, a hull shader instance, a domain shader instance or a geometry shader instance) which can be executed to perform the operation on the graphics data item. In a graphics processing system, similar computation instances are likely to be performed multiple times with different data items, e.g. a shader program may be executed multiple times for respective pixels of a primitive which overlaps those pixels. Therefore, these computation instances are well suited for execution in a Single Instruction Multiple Data (SIMD) manner. Therefore, computation instances are grouped into tasks for execution on a SIMD processor. Each task comprises a plurality of computation instances, with the number of computation instances in a task being implementation dependent, e.g. dependent on the width of the SIMD processor on which the tasks are executed. For example, in examples described herein each task is capable of containing up to 32 computation instances, but in other examples, each task may be capable of containing a different number of computation instances, e.g. 8, 16 or 64. It may be preferable, for efficiency reasons, for the number of computation instances that can be included in a task to be a power of 2.

Since a SIMD processor executes a single instruction on multiple data items in parallel, the computation instances which are included in a common task for SIMD execution should be compatible with each other, i.e. share characteristics for execution. For example, the computation instances included in the same task are compatible if they have the same shader type (e.g. if they belong to the same shader execution, i.e. the same pipeline stage) and share the same state or a compatible state. For example, two states may be considered to be compatible for a given pipeline stage if the shader code, the constant buffers, the shader resources, the sampler states and the input buffers bound to that pipeline stage are the same.

In a simple example, rather than executing a computation instance as soon as it is created, computation instances are grouped into a task. When the task becomes full of computation instances (in some examples, up to 32 computation instances may be included in a task) then the task is sent for processing by a SIMD processor such that the computation instances included in the task are executed in parallel. Further computation instances can then be included in a new task. If a new computation instance is not compatible with the computation instances currently included in an open task (e.g. if the new computation instance relates to a different shader type than the previous computation instances, or if the state for the new computation instance is different to the state for the previous computation instances) then the current task can be flushed to the SIMD processor for execution even if the task is not full (e.g. if the task has capacity for 32 computation instances but includes fewer than 32 computation instances). This allows the new computation instance to be allocated to a new task. However, this results in tasks which are not completely full being executed by the SIMD processor. When tasks are executed before they are completely full with computation instances, the efficiency of the SIMD processing is reduced. In other words, increasing the average number of computation instances which are included in tasks which are executed by a SIMD processor can improve the efficiency of the SIMD processing. It follows that an increase in the number of state changes and/or shader type changes that occur (which cause SIMD tasks to be flushed) may tend to result in a decrease in the SIMD processing efficiency.

In the geometry processing phase, input graphics data items are processed to generate all of the sub-primitives which derive from those input graphics data items before considering the next input graphics data items. Therefore, in the geometry processing phase, many computation instances are often created consecutively for a particular input graphics data item, and those computation instances are likely to share state and shader types. Therefore, in the geometry processing phase, many computation instances can often be grouped into a task before it is flushed. However, as will become apparent from the description below, in the rasterisation phase the state and/or shader types are more likely to change between consecutively created computation instances, so the efficiency of the SIMD processing in the rasterisation phase may be lower than in the geometry processing phase. Examples described below provide an improved task occupancy rate, thereby improving the SIMD processing efficiency in the rasterisation phase compared to the simple approach described above.

Figure 2:
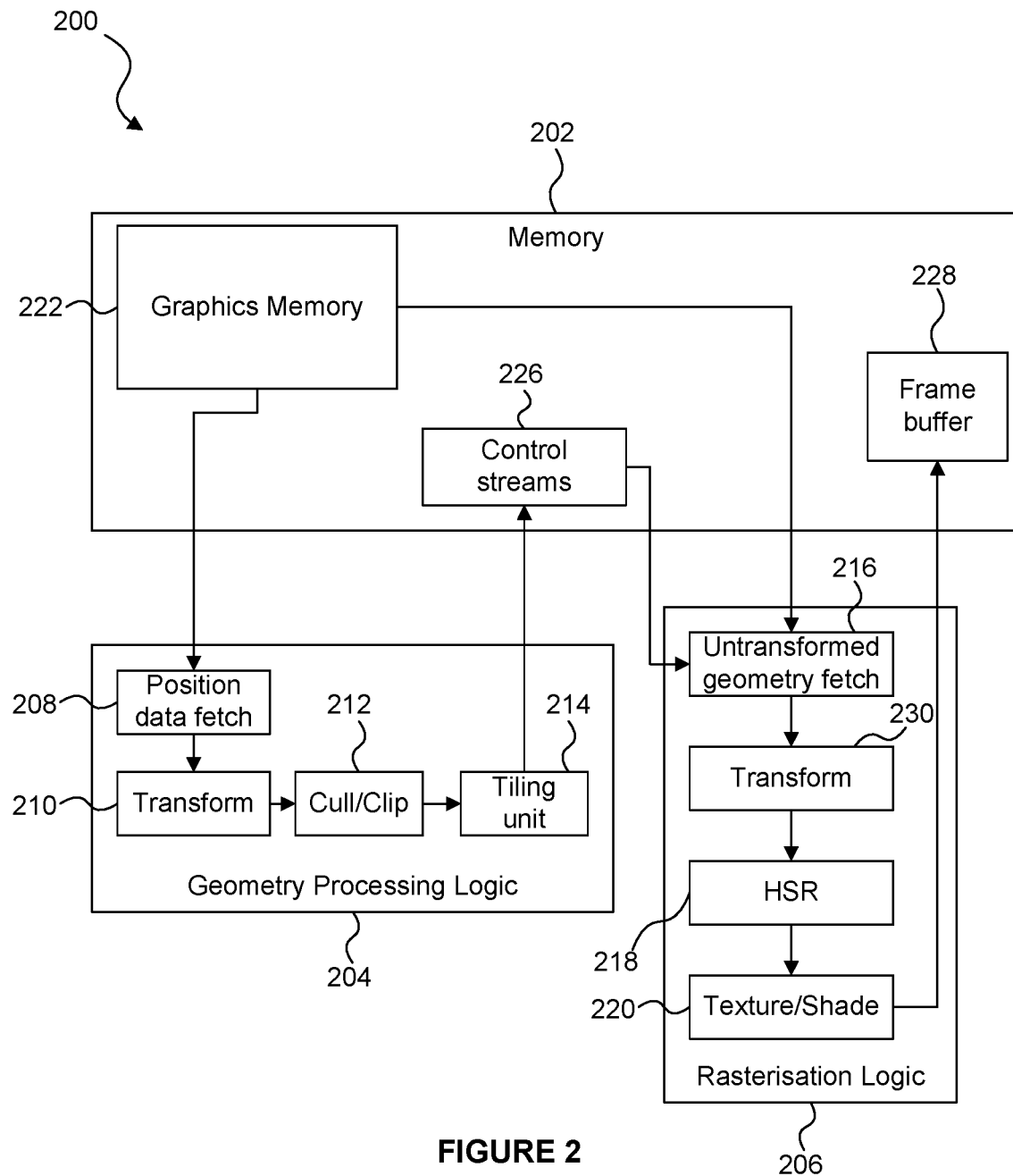
FIG. 2 shows an example of a second prior art graphics processing system which uses untransformed display lists.
Figure 3:
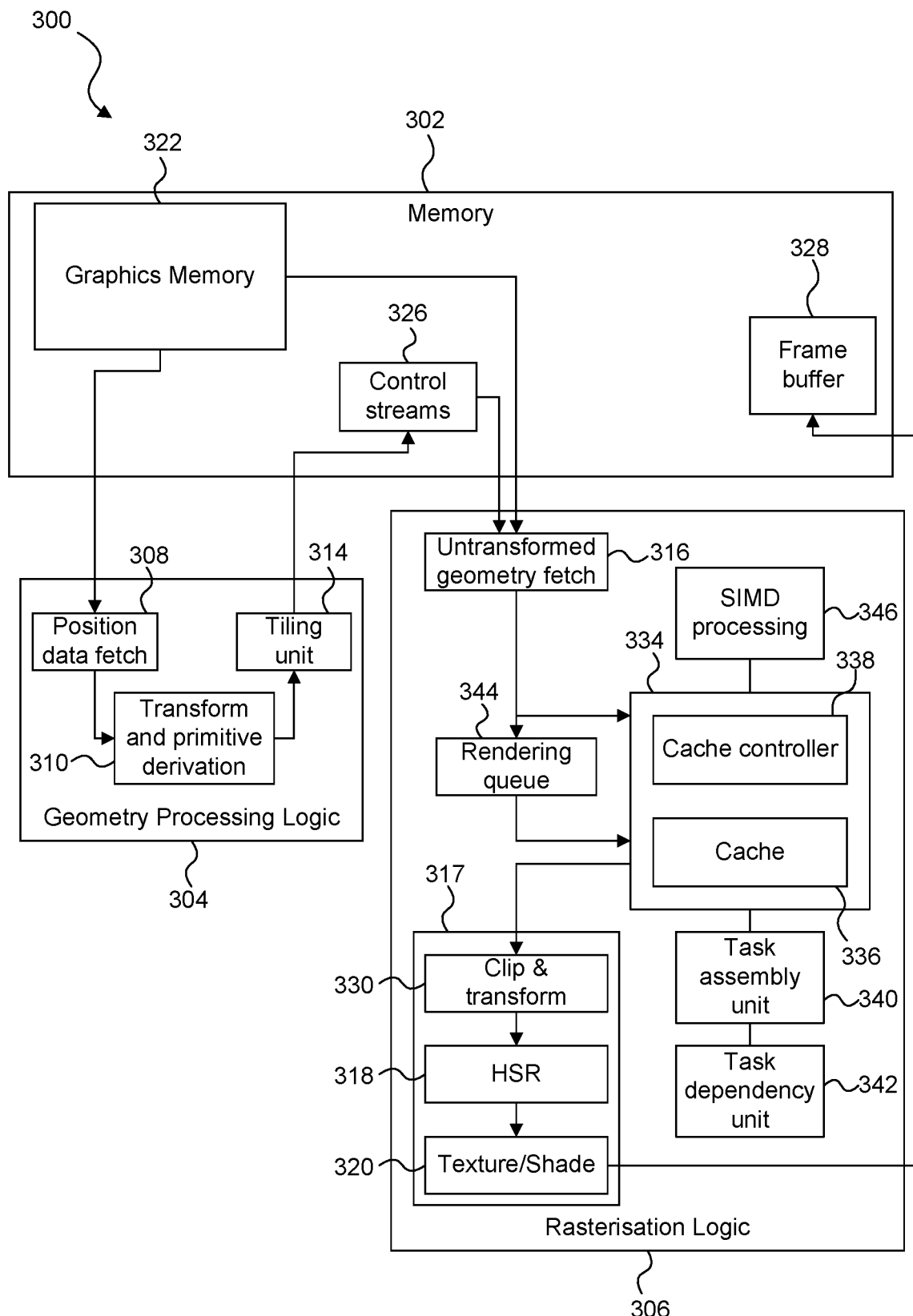
FIG. 3 shows a graphics processing system according to embodiments described herein.

FIG. 3 shows a graphics processing system 300 according to embodiments described herein. The system 300 is similar to the system 200 shown in FIG. 2, but includes components for deriving sub-primitives. In particular, system 300 comprises a memory 302, geometry processing logic 304 and rasterisation logic 306. The geometry processing logic 304 and the rasterisation logic 306 may be implemented on a GPU and may share some processing resources, as is known in the art. The geometry processing logic 304 comprises a geometry data fetch unit 308, transform and primitive derivation logic 310, and a tiling unit 314. The rasterisation logic 306 comprises a fetch unit 316, a rendering queue 344 and primitive processing logic 317. The primitive processing logic 317 comprises clip and transform logic 330, a HSR unit 318, and a texturing/shading unit 320. The rasterisation logic 306 also comprises a cache system 334 which includes a cache 336 and a cache controller 338. The rasterisation logic 306 also comprises a task assembly unit 340, a task dependency unit 342 and SIMD processing logic 346. The memory 302 may be implemented as one or more physical blocks of memory, and includes a graphics memory 322, a control stream memory 326 and a frame buffer 328.

Figure 4:
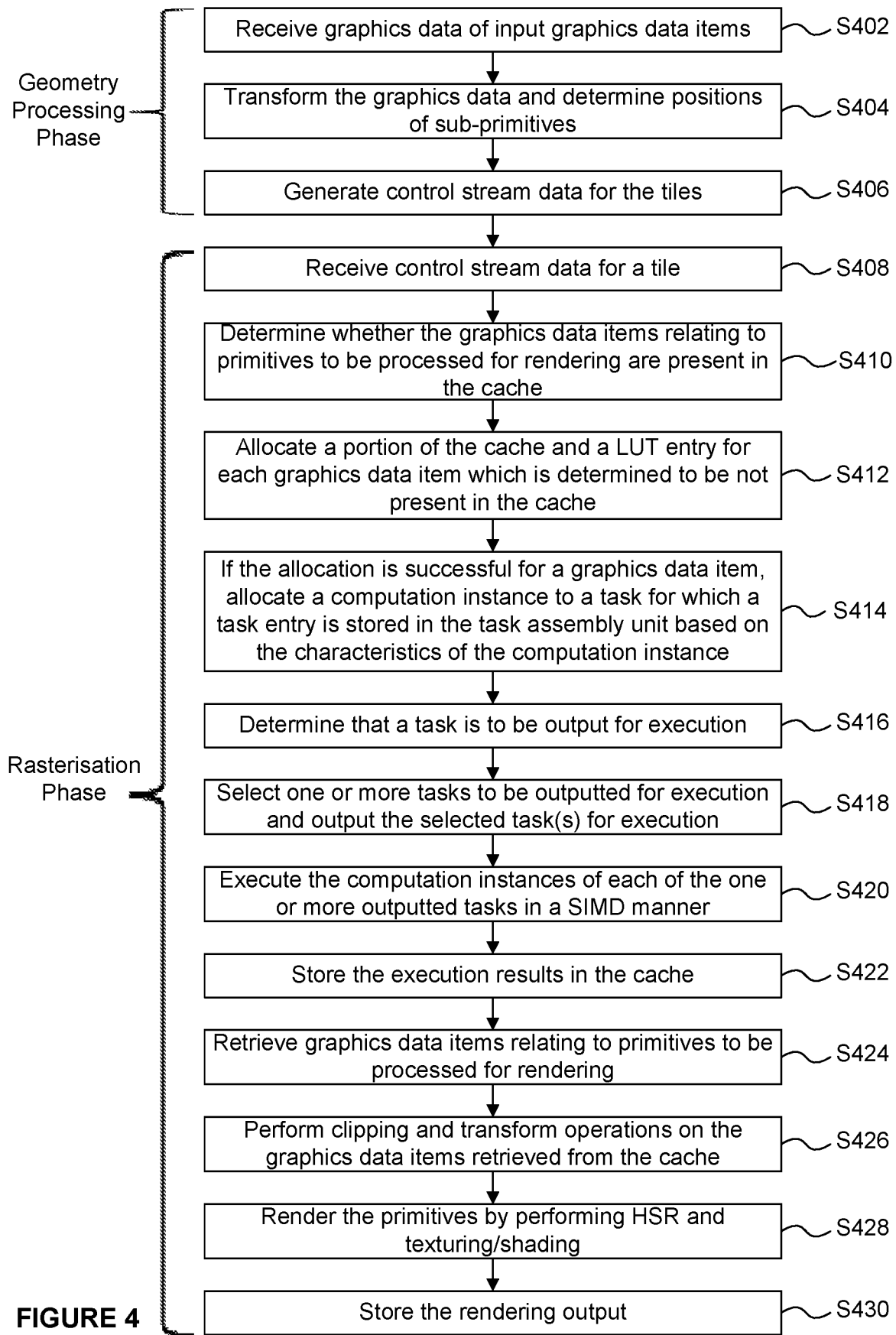
FIG. 4 is a flow chart showing a method of processing primitives in a graphics processing system.

Operation of the system 300 is described in one example with reference to the flow chart shown in FIG. 4.

In step S402 the geometry data fetch unit 308 fetches geometry data from the graphics memory 322 and passes the fetched data to the transform and primitive derivation logic 310. The fetched data may be "position data" which may include data for use in computing the position of graphics data items. For example, the fetch unit 308 might fetch only position data of the graphics data items because other data of the graphics data items (e.g. colour data or texture data to be applied to the graphics data items, etc.) is not needed by the geometry processing logic 304. As described above, the graphics data items may for example be primitives or control points describing a patch to be tessellated.

In step S404 the transform and primitive derivation logic 310 transforms the position data of the graphics data items into the rendering space. Further in step S404 the transform and primitive derivation logic 310 determines transformed positions within the rendering space of one or more sub-primitives derived from the input graphics data items. Step S404 may involve performing a number of different functions because sub-primitives may be derived from the input graphics data items in a number of different ways. In particular, the transform and primitive derivation logic 310 may comprise one or more processing modules for deriving the transformed sub-primitives from the input graphics data items, e.g. a vertex shading module, a geometry shading module and/or a tessellation module. The transform and primitive derivation logic 310 also comprises a clip/cull unit which is similar to the clip/cull units described above in relation to FIGS. 1 and 2. The positions of sub-primitives derived by the transform and primitive derivation logic 310, and the transformed position data of graphics data items from which no sub-primitives are derived, are provided to the cull/clip unit for clipping and/or culling of graphics data items which do not fall completely within the rendering space.

Figure 5:
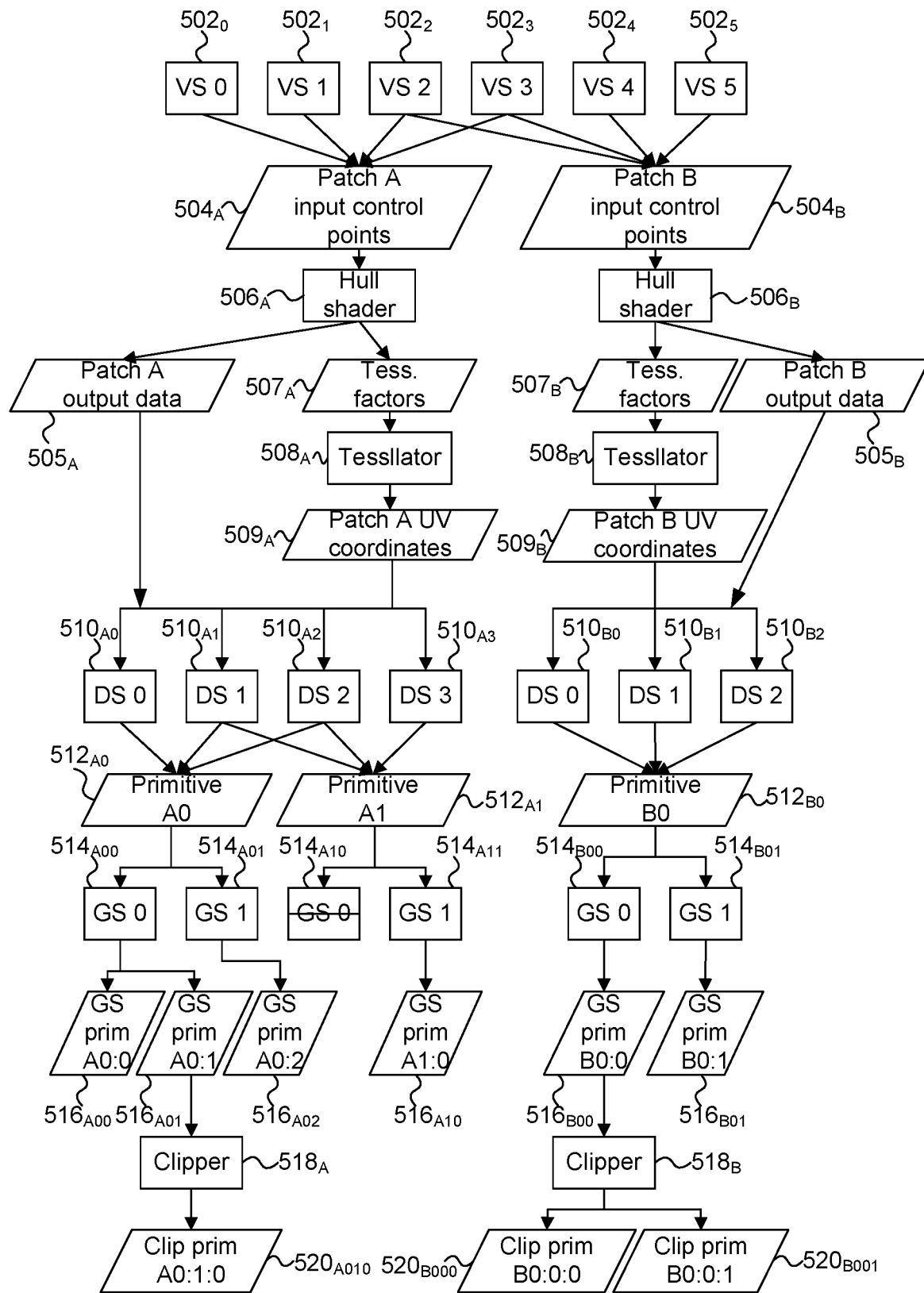
FIG. 5 shows an example of a sequence of processing stages used to generate sub-primitives from input graphics data items.

FIG. 5 shows an example of a sequence of processing stages by which sub-primitives are derived from input graphics data items. Rectangles represent operations while parallelograms represent their inputs and outputs. The output of an operation can be read as an input by multiple operations in the lower levels of the hierarchy. The examples described herein refer to the transform and primitive derivation logic 310 acting on graphics data items, without explicitly saying, although it is to be understood or be the case, that it is the position data of those graphics data items on which the transform and primitive derivation logic 310 acts. FIG. 5 shows two patches ($504_A$ and $504_B$) which both include four input control points. Two of the control points are shared by both of the patches 504, such that there are six different control points in the example shown in FIG. 5. A respective vertex shader instance ($502_0$ to $502_5$) is used by the transform and primitive derivation logic 310 to transform the six control points into the rendering space. The outputs from vertex shaders $502_0$ to $502_3$ describe the first patch $504_A$, and the outputs from vertex shaders $502_2$ to $502_5$ describe the second patch $504_B$. The transform and primitive derivation logic 310 implements two instances of a hull shader $506_A$ and $506_B$ (one for each of the patches $504_A$ and $504_B$) and two instances of a fixed-function tessellator $508_A$ and $508_B$. Each hull shader instance ($506_A$ and $506_B$) generates the tessellation factors ($507_A$ and $507_B$), which define the tessellated primitives representing the respective patches $504_A$ and $504_B$. The hull shader instances ($506_A$ and $506_B$) also generate other patch output data ($505_A$ and $505_B$) including the output control points and the patch constant data to be used in domain shaders. The hull shader instances 506 prepare the tessellation factors $507_A$ and $507_B$, and the tessellators 508 perform the tessellation to generate the vertex UV coordinates $509_A$ and $509_B$ that define the tessellated primitives. In the simple example shown in FIG. 5, the patch A $504_A$ produces two tessellated primitives, while patch B $504_B$ produces one tessellated primitive (due to different tessellation factors). It should be apparent that in other examples different numbers of primitives may be produced by the tessellation, and in particular many more than two primitives may be produced, e.g. tens, hundreds or even thousands of primitives may be produced by tessellating a patch. Vertex data for vertices of tessellated primitives (which are defined by the vertex UV coordinates 509 from tessellators 508, and the output control points and other graphics patch data items 505 from hull shaders 506) are input into the domain shader instances 510 which are used to manipulate the tessellated vertices, e.g. to apply a height map to the vertices, etc. The transform and primitive derivation logic 310 implements seven instances of a domain shader ($510_{A0}$ to $510_{B3}$ and $510_{B0}$ to $510_{B2}$) which apply respective transforms to the vertices of the tessellated primitives representing the patches $504_A$ and $504_B$. The transformed vertices provided by domain shaders $510_{A0}$, $510_{B1}$ and $510_{B2}$ represent tessellated primitive $512_{A0}$. The transformed vertices provided by domain shaders $510_{A1}$, $510_{A2}$ and $510_{A3}$ represent tessellated primitive $512_{A1}$. The transformed vertices provided by domain shaders $510_{B0}$, $510_{B1}$ and $510_{B2}$ represent tessellated primitive $512_{B0}$. It is noted that vertices for tessellated primitives produced from the same patch can be shared (e.g. primitives $512_{A0}$ and $512_{A1}$ share two vertices). The tessellated primitives ($512_{A0}$, $512_{A1}$ and $512_{B0}$) generated by the tessellation stages are fed into a geometry shader (GS) stage of the transform and primitive derivation logic 310, which is configured to run two instances of a geometry shader per primitive. The number of primitives generated by each GS instance varies from 0 to an upper bound specified by the application (e.g. up to 256) depending on the operation that the GS instances are arranged to perform. In the simple example shown in FIG. 5, from 0 to 2 primitives are produced by each of the GS instances. In particular, the GS instance $514_{A00}$ is applied to the primitive $512_{A0}$ and produces two primitives $516_{A00}$ and $516_{A01}$; the GS instance $514_{A01}$ is applied to the primitive $512_{A0}$ and produces one primitive $516_{A02}$; the GS instance $514_{A10}$ is applied to the primitive $512_{A1}$ and produces zero primitives; the GS instance $514_{A11}$ is applied to the primitive $512_{A1}$ and produces one primitive $516_{A10}$; the GS instance $514_{B00}$ is applied to the primitive $512_{B0}$ and produces one primitive $516_{B00}$; and the GS instance $514_{B01}$ is applied to the primitive $512_{B0}$ and produces one primitive $516_{B01}$.

FIG. 5 shows an example of a sequence of processing stages by which sub-primitives are derived from input graphics data items. In other examples, different processing stages may be performed and fewer or more processing stages may be performed in the sequence. In the examples described herein, the sequence of processing stages may comprise implementing one or more of a vertex shader, a hull shader, a domain shader and a geometry shader. For example, in some examples, only vertex shading is performed, and in other examples, vertex shading and clipping is performed. Other combinations of processing stages may be implemented in other examples.

As described above, the transform and primitive derivation logic 310 can clip some of the primitives if they extend outside of the viewing frustum, but some of the GS generated primitives are not clipped in the example shown in FIG. 5. For example, when a primitive is clipped, up to fifteen sub-primitives (seventeen vertices) may be produced when using the six standard clipping planes and eight custom clipping planes. However, in the simple example shown in FIG. 5, the primitive $516_{A01}$ is clipped to produce one primitive $520_{A010}$ and the primitive $516_{B00}$ is clipped to produce two primitives $520_{B000}$ and $520_{B001}$. The primitives $516_{A00}$, $516_{A02}$, $516_{A10}$ and $516_{B01}$ are not clipped. The leaf nodes of the hierarchy (i.e. primitives $516_{A00}$, $520_{A010}$, $516_{A02}$, $516_{A10}$, $520_{B000}$, $520_{B001}$ and $516_{B01}$ in the example shown in FIG. 5) are the sub-primitives which are to be rendered. In some examples, input primitives may pass through the transform and primitive derivation logic 310 without any sub-primitives being generated, such that the clipping may be applied to input primitives in some examples. Therefore, in general, the transform and primitive derivation logic 310 culls and/or clips graphics data items (including the derived sub-primitives) which are situated outside of a viewing frustum. The remaining primitives and sub-primitives are passed to the tiling unit 314.

In step S406 the tiling unit 314 generates control stream data for each of the tiles of the rendering space. The control stream data for a tile includes identifiers of input graphics data items which are to be used for rendering the tile, e.g. primitives from the graphics memory 322 which, when transformed, are positioned at least partially within the tile or primitives from the graphics memory 322 from which sub-primitives are derived which are positioned at least partially within the tile. The identifiers in the control stream data identify input graphics data items, i.e. graphics data items stored in the graphics memory 222. The control stream data for a tile also includes primitive indications to indicate which of the primitives derived from the input graphics data items (i.e. which of the sub-primitives) are to be used for rendering the tile. A sub-primitive may be determined to be for use in rendering a tile if the sub-primitive is at least partially in the tile. The sub-primitive indications can be used during the rasterisation phase to reduce the amount of processing which is performed to derive the sub-primitives for a tile. The sub-primitive indications may, for example, indicate how to derive the sub-primitives to be used for rendering a tile from the transformed input graphics data items. For example, the sub-primitive indications may indicate a sequence of processing operations which are performed on the input graphics data items in order to generate the sub-primitives which are to be rendered. Therefore, the rasterisation phase can perform the indicated operations (but does not need to perform operations which are not indicated) in order to derive the necessary sub-primitives to be rendered for a tile. For example, the sub-primitive indications in the control stream relating to the example shown in FIG. 5 may indicate that the GS instance $514_{A10}$ does not produce any primitives, in which case this GS instance might not be executed in the rasterisation phase.

Furthermore, it may be the case that some of the sub-primitives which are the leaf nodes shown in FIG. 5 might not be positioned at least partially within a particular tile. For example, the primitive $516_{A02}$ might lie completely outside of a particular tile, in which case an indication of the sub-primitive $516_{A02}$ would not be included in the control stream data for the particular tile. Therefore, in the rasterisation phase the rasterisation logic would not need to implement the geometry shader $514_{A01}$.

The sub-primitive indications could be represented as one or more masks. For example a mask for a sub-primitive may indicate which of a set of possible operations are to be performed to derive a sub-primitive. A mask may also indicate which of a set of possible sub-primitives are culled or clipped. A mask may also indicate which sub-primitives derived from an original primitive are present in a tile, and which are not present in the tile. Furthermore, the identifiers of input graphics data items in the control stream data may be implemented as one or more masks indicating which graphics data items from blocks of graphics data items are to be used for rendering a particular tile. Identifiers of input graphics data items in the control stream data may or may not be shared among portions of the control stream data referring to different tiles, provided it is possible to reconstruct the control stream data for each of the particular tiles.

The identifiers and sub-primitive indications in the control stream data may be compressed, according to any suitable compression technique. The control stream data for the tiles is provided to the memory 302 for storage in the control stream memory 326. At this point the geometry processing phase has been completed for the current render, and at a subsequent time, the rasterisation phase is performed to render the tiles of the rendering space using the input graphics data stored in the graphics memory 322 and the control stream data stored in the control stream memory 326.

Figure 6:
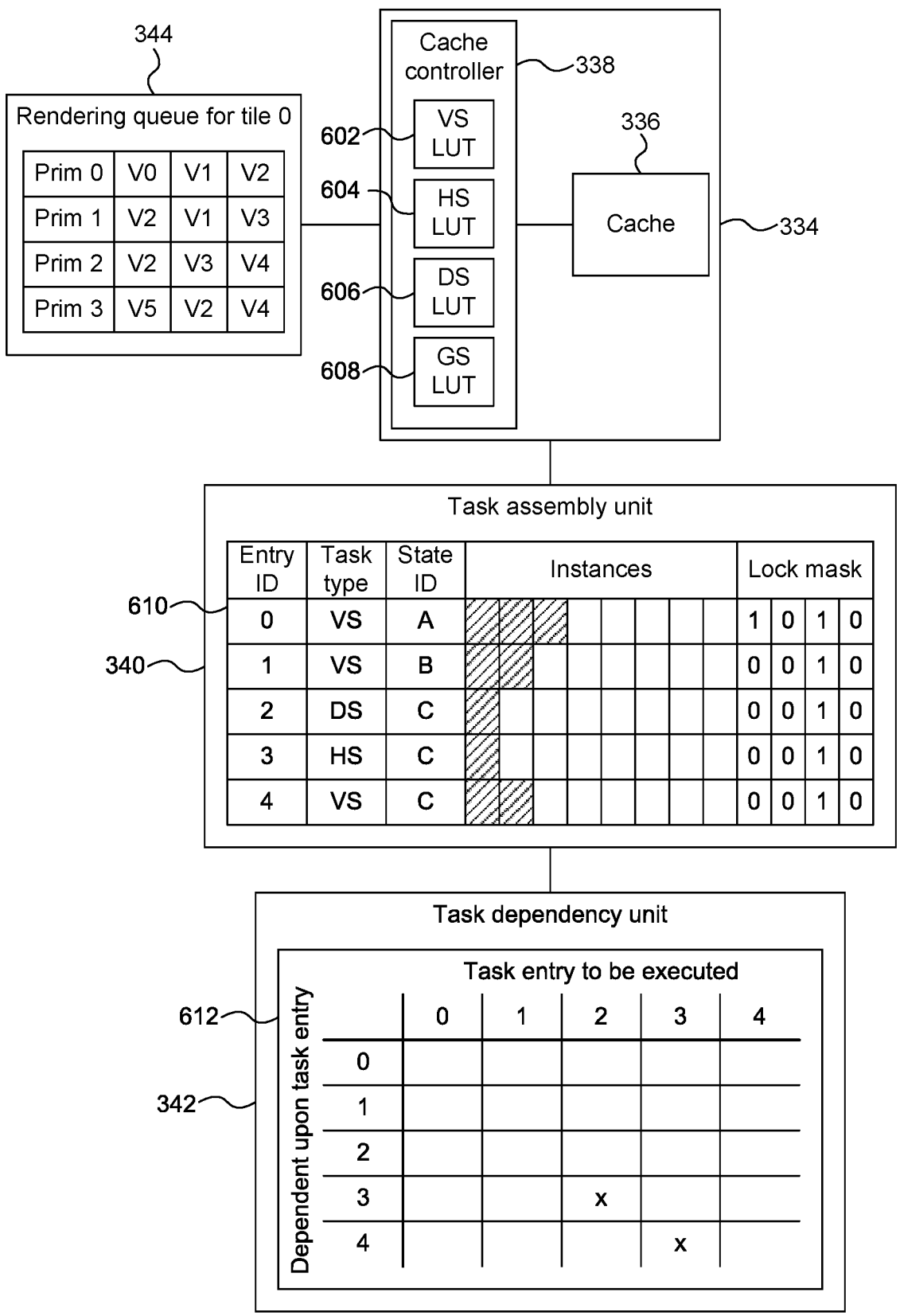
FIG. 6 shows a more detailed representation of some of the components of the graphics processing system shown in FIG. 3.

The rendering of a particular tile in the rasterisation phase is now described. In step S408, the fetch unit 316 of the rasterisation logic 306 receives the control stream data for a tile from the control stream memory 326 and passes the control stream data to the cache system 334 and to the rendering queue 344. The rendering queue 344 (which may also be referred to as a "rasterisation queue") stores indications (e.g. primitive identifiers) of primitives to be processed for rendering. As shown in FIG. 6, the rendering queue 344 also stores vertex indices to indicate which vertices make up the primitives to be rendered. In the example shown in FIG. 6, there are four primitives currently in the rendering queue 344: primitive 0 which is formed from vertices V0, V1 and V2; primitive 1 which is formed from vertices V2, V1 and V3; primitive 2 which is formed from vertices V2, V3 and V4; and primitive 3 which is formed from vertices V5, V2 and V4. In some examples, multiple tiles may be processed in parallel by the rasterisation logic 306, using respective tile processing pipelines (each of which may be identified by a unique tile pipeline ID), and in those examples, there may be a respective rendering queue for each tile currently being processed by the rasterisation logic 306. If a primitive covers more than one tile, its primitive ID may be included in more than one of the rendering queues accordingly.

In step S410, the cache controller 338 determines whether the graphics data items (e.g. primitives) to be processed for rendering, as indicated by the identifiers in the control stream data for the tile, are present in the cache 336. The cache controller 338 may include one or more lookup tables indicating the current contents of the cache 336, such that the cache controller 338 can use the lookup table(s) to determine whether graphics data items relating to primitives to be processed for rendering are present in the cache 336. Space in the cache may be allocated when the computation instance that will generate that graphics data item is scheduled, rather than when the result becomes available. With each graphics data item allocated in the cache, the cache controller also stores a state bit indicating whether the graphics data item is still scheduled for execution or whether the execution has occurred and the resulting graphics data item is available in the cache. If the graphics data item is scheduled for execution, the cache controller also stores an identifier of the SIMD task that will compute the value of the graphics data item. Graphics data items can be allocated and locked in the cache 336, but if the corresponding state bit indicates that the graphics data item is "scheduled" then a pending task has still to produce its value. Once the identified SIMD task is executed, the state bit of the calculated graphics data items will be changed to indicate that they are now available. FIG. 6 shows a more detailed view of the cache system 334 which illustrates that in this example, the cache controller 338 includes a vertex shader lookup table 602, a hull shader lookup table 604, a domain shader lookup table 606 and a geometry shader lookup table 608. The lookup tables contain information about the different stages of the graphics pipeline and may or may not be implemented in the same hardware structure as each other. The cache controller 338 can determine whether graphics data items (e.g. primitives or control points) are present in the cache 336 by querying the lookup table(s). For example, the cache controller 338 may be implemented using a lookup table for each stage of the processing sequence. In the example shown in FIG. 6 the vertex shader lookup table 602 indicates if (and if so, where) the results of respective vertex shader invocations are stored in the cache 336; the hull shader lookup table 604 indicates if (and if so, where) the results of respective hull shader invocations are stored in the cache 336; the domain shader lookup table 606 indicates if (and if so, where) the results of respective domain shader invocations are stored in the cache 336; and the geometry shader lookup table 608 indicates if (and if so, where) the results of respective geometry shader invocations are stored in the cache 336. The lookup tables allow searching for the result of a univocally identified execution. For example, given the draw call number, the instance identifier and the index of a vertex, a vertex shader invocation is univocally identified. Similar concepts apply to the other shader stages, with the entries in the cache 336 from different shaders being identified by a different set of values, which can generally be referred to as "tags". When a lookup table is shared by multiple shader stages, the tags include selector bits (e.g. two selector bits) to determine the shader stage that the data items belong to. The remaining bits of the tag may be structured differently depending on the shader stage. The amount of output produced by each shader stage can vary, and the cache 336 may allocate different maximum sizes to the outputs from the different stages. The lookup tables may be implemented as fully-associative or set-associative.

The cache 336 may be referred to as a buffer. The cache 336 may comprise a single memory pool for storage of data from all of the levels of the hierarchy, e.g. the different types of graphics data items shown in FIG. 5 (504, 509, 512, 516 and 520) may all be stored in the same memory pool in the cache 336. This may allow flexibility in what data can be stored in the cache 336. In other examples, the cache 336 may comprise a plurality of memory pools, wherein different ones of the memory pools are configured to store data from different levels of the hierarchy. For example, a first memory pool of the cache 336 may be configured to store the input graphics data items fetched from the graphics memory 322, a second memory pool of the cache 336 may be configured to store patch input control points (e.g. 504), a third memory pool of the cache 336 may be configured to store patch output data (e.g. 505) in conjunction with vertex UV coordinates (e.g. 509), a fourth memory pool of the cache 336 may be configured to store the outputs of domain shaders (e.g. 512), a fifth memory pool of the cache 336 may be configured to store the outputs of geometry shaders (e.g. 516), and a sixth memory pool of the cache 336 may be configured to store the outputs of clippers (e.g. 520), although in examples described herein the outputs of clippers are not stored in the cache 336. Therefore, in some examples, the hierarchy includes one or more of the input graphics data items and one or more graphics data items representing results of processing stages of the sequence of processing stages. In some other examples, the hierarchy might not include input graphics data items, e.g. if the input graphics data items can be inferred by some other mechanism. For example, the inputs of a vertex shader instance might not be stored in the cache 336, and may instead be stored in another module such as in a system level cache. Using different memory pools for different types of data allows data to be flushed or evicted from the cache 336 depending on the type of the data independently, and it also stops the cache 336 becoming dominated by one type of data, e.g. it stops frequently executed shader stages (such as the domain shader) evicting data from the cache 336 for less frequently executed, but potentially computationally expensive, stages (such as the hull shader).

The cache 336 has a finite size which is typically not large enough to simultaneously store all of the graphics data items which are used during the rendering of an image. Therefore, at some point data items may need to be evicted from the cache to allow other data items to be stored in the cache.

In step S410, a query to the cache controller determines if the graphics data items required to generate a primitive are present in the cache 336. This might include graphics data items from different shader stages (e.g., the GS graphics data item that generates the primitive and the VS graphics data items that provide the input to the GS). The query is performed bottom up from the last shader stage to the first (e.g., the GS first, then the VS). The query stops if all the graphics data items for generating the primitive for a given shader stage are found to be present and available in the cache. If a required graphics data item is available in the cache 336 then a lock is placed on the graphics data item in the cache 336 so that it will not be evicted from the cache 336 before it has been used. If a required data item is not available, a portion of the cache and a lookup table entry is allocated for it, possibly evicting other graphics data items (step S412). If any of the allocations fails due to locks preventing evictions of other graphics data items, the query fails and will be attempted later after one or more rendering pipelines have been flushed, releasing locks. In other words, when an allocation fails, one or more rendering queues are flushed. Before flushing a rendering queue, all the tasks necessary for that rendering queue are executed. After flushing the rendering queue, the appropriate locks are released. If the allocation is successful, then in step S414 a computation instance, for generating the required graphics data item, is allocated to a task based on characteristics of the computation instance, as described in more detail below. In this way, the computation instance generating the required data item is scheduled for execution within a SIMD task. The SIMD task, once executed, will write the value of the graphic data item to the allocated portion of the cache. The computation instance might be, for instance, a vertex shader generating a vertex or a hull shader instance generating the patch constant data and output control points. When the query completes, the required data items are locked for the current tile processing pipeline. This guarantees that the graphics data item will not be evicted before the primitive is rasterized during the flush of the rendering queue 344. Moreover, if a required data item is present in the cache but not available (scheduled), the task that will generate its data is locked for the current tile processing pipeline. This guarantees that the required task will be executed before the primitive is rasterized during the flush of the rendering queue 344. After a query is completed, the primitive is added to the rendering queue. As described in more detail below, the data is read from the cache 336 when the rasterization queue is flushed. This allows the SIMD tasks to be built up until the time at which the rasterization queue is flushed.

The task assembly unit 340 (which may also be referred to as a "task gatherer") is configured to store a plurality of task entries for respective tasks to which computation instances can be allocated. FIG. 6 shows that the task assembly unit 340 includes a table 610 of data for task entries. In the example shown in FIG. 6, five task entries are shown in the table 610, with each entry including an entry ID, a task type, a state ID, slots for a plurality of computation instances, and a set of lock mask bits. The entry ID is an identifier of the task entry in the table 610. The task type field of an entry indicates the shader type of the computation instances included in a task. For example, the task entries with entry IDs 0, 1 and 4 are for tasks including vertex shading instances; the task entry with entry ID 2 is for a task including domain shading instances; and the task entry with entry ID 3 is for a task including hull shading instances. The state ID field for a task entry indicates the state to be used for execution of the computation instances in the task. As described above, the state may specify execution conditions, such as the shader code, the constant buffers, the shader resources, the sampler states and the input buffers bound to the pipeline stage for the execution of the computation instances. The shader type and state ID define characteristics of computation instances, such that the task entries in the table 610 include indications of the associated characteristics of computation instances which can be allocated to the respective tasks.

The tasks for which task entries are stored in the table 610 are "open" tasks to which computation instances can be allocated, i.e. they are not full tasks to which no more computation instances can be allocated. The task assembly unit 340 can store the allocated computation instances in the task entries for the respective tasks to thereby indicate which computation instances have been allocated to the respective tasks. In the example shown in FIG. 6, each task can include up to eight computation instances, but in other examples each task can be allocated more or fewer than eight computation instances (e.g. up to 32 computation instances may be allocated to tasks in a particular example). In some examples, the number of computation instances which can be allocated to tasks might be different for different shader types, but in the example shown in FIG. 6 all of the tasks can have the same number of computation instances allocated thereto.

Each of the task entries indicate which computation instances have been allocated to the respective tasks (denoted with hatching in FIG. 6). As an example, the task for which task entry 0 is stored in the table 610 currently has three computation instances allocated thereto and has space for up to five more computation instances to be allocated thereto (denoted with unhatched boxes in FIG. 6).

The lock mask bits of a task entry identify which of the tile processing pipelines will use the results of the computation instances that belong to the respective task. For example, FIG. 6 shows that up to four tile pipelines (e.g. tiles 0 to 3) may be processed in parallel. In the example shown in FIG. 6 the task for which task entry 0 is stored includes computation instances which will be used for processing tiles 0 and 2, but not for tiles 1 and 3; whereas the tasks for which task entries 1, 2, 3 and 4 are stored include computation instances which will be used for processing tile 2 but not for tiles 0, 1 or 3. The lock mask bits of a task entry can be updated as computation instances are allocated to the respective task. When flushing a rendering queue, the lock bits of a task are used to determine which tasks need to be flushed to initialize the required graphics data items.

As mentioned above, in step S414, for each graphics data item which is determined to be not present in the cache 336, the task assembly unit allocates a computation instance to a task based on the characteristics of the computation instance. For example, if a vertex shading instance is to be executed with state A then the vertex shading instance can be allocated to the task entry 0. As another example, if a vertex shading instance is to be executed with state B then the vertex shading instance can be allocated to the task entry 1. In this way, the computation instances allocated to a task can be executed in parallel by a SIMD processor because they have compatible characteristics (e.g. a common shader type and compatible states). Since the task assembly unit 340 can store a plurality of open tasks which may be for storing computation instances with different characteristics, it is not always necessary to flush a task for execution when the state or shader type of computation instances changes. If the characteristics (e.g. shader type and state) of a computation instance do not match those of any of the task entries currently stored in the task assembly unit 340, then a new task entry for a new task can be added to the table 612 with characteristics matching those of the computation instance, such that the computation instance can be added to the new task. If there is no space in the task assembly unit 340 for storing a new task entry then one of the currently stored tasks may need to be outputted from the task assembly unit 340 before the new task entry is stored therein.

Some computation instances are dependent upon the results of other computation instances. For example, a lower processing stage of the hierarchy is dependent upon a higher processing stage of the hierarchy. For example, a domain shading instance, e.g. DSO (denoted $510_{A0}$ in FIG. 5), is dependent upon the results of a hull shading instance $506_A$ (which includes the tessellation $508_A$), which in turn is dependent upon the results of vertex shading instances $502_0$ to $502_3$. So if, the primitive $512_{A0}$ is to be rendered (i.e. the primitive ID for primitive $512_{A0}$ is in the rendering queue 544) then the results of domain shaders $510_{A0}$, $510_{A1}$ and $510_{A2}$ are searched for in the cache 336. As an example, it may be the case that the results of domain shaders $510_{A1}$ and $510_{A2}$ are already stored in the cache 336, so cache hits are returned for these vertices, but in this example the result of domain shader $510_{A0}$ is not currently stored in the cache 336 so a domain shading instance is generated for $510_{A0}$. This computation instance may have state C, and is stored in task entry 2 as shown in FIG. 6. In order to execute the domain shader $510_{A0}$ the results of hull shader instance $506_A$ (including tessellation $508_A$) are needed, and if these results are not currently stored in the cache 336 then a hull shading instance is generated for $506_A$ (including tessellation $508_A$). This computation instance also has state C, but because the shader type is not a domain shader, the computation instance is stored in task entry 3 as shown in FIG. 6. In order to execute the hull shader $506_A$ the results of vertex shader instances $502_0$ to $502_3$ are needed. As an example, results of vertex shader instances $502_2$ and $502_3$ are already stored in the cache 336 (e.g. since control points $504_B$ may have already been computed). However, the results of vertex shader instances $502_0$ and $502_1$ are not already stored in the cache 336, so two vertex shading instances are generated for $502_0$ and $502_1$. These computation instances also have state C, but because the shader type is not a domain shader or a hull shader, the computation instances are stored in task entry 4 as shown in FIG. 6.

In this example, the rendering queue 344 contains descriptors for clipper input primitives, i.e. primitives to which clipping has not yet been applied, and the processing performed by the SIMD processing logic 346 does not include clipping operations. Therefore, none of the computation instances which are included in tasks for execution by the SIMD processing logic 346 are for performing clipping operations. Each clipper input primitive descriptor consists of references to the vertices within the cache 336 and some extra information required for clipping, rasterizing or shading the primitive. The references in the cache are guaranteed to be valid at the time of flushing the queue because of the locks on the graphics data items and the necessary SIMD tasks were acquired after steps S412 and S414. The untransformed geometry fetch unit 316 can forward a flag, stored within the descriptor, indicating whether a primitive in the queue needs to be clipped (this information is known from the geometry processing phase) and, if it does, which clipper generated primitives have to be rasterized in the current tile. The vertices of a primitive can be stored in one or more graphics data items. For instance, a GS-generated triangle might be represented by a reference to a single GS graphics data item and by three offsets identifying the location of the vertices within the graphics data item. A tessellator-generated line might be represented by two references to distinct DS graphics data items (no offset is needed since a DS graphics data item only contains one vertex). In other examples, the rendering queue 344 may contain descriptors for clipper output primitives, i.e. primitives to which clipping has been applied, and in those other examples, the processing performed by the SIMD processing logic may include clipping operations, such that some of the computation instances which are included in tasks for execution by the SIMD processing logic may be for performing clipping operations.

The task dependency unit 342 maintains indications of dependencies between different tasks for which task entries are stored in the task assembly unit 340. In the example shown in FIG. 6 the task dependency unit 342 includes a matrix 612 which indicates which tasks, if any, each task entry to be executed is dependent upon. In FIG. 6, an 'x' indicates that the task for task entry 2 is dependent upon the task for task entry 3, and another 'x' indicates that the task for task entry 3 is dependent upon the task for task entry 4. An absence of an 'x' in FIG. 6 indicates that a task is not dependent upon a particular other task.

As described above, in step S412, the cache controller 338 allocates a portion of the cache 336 (and a corresponding LUT entry) for each of the graphics data items to be determined by respective computation instances allocated to tasks in the task assembly unit 340. In this way, it is ensured that the cache 336 has an allocated portion of memory for the result of each of the computation instances. Therefore, when the computation instances are executed the results of the execution can be stored in the cache 336 (in the respective allocated portion), without evicting data which is still to be used from the cache 336. The cache controller 338 may lock the portions of the cache 336 which are allocated to computation instances relating to primitives to be processed for rendering until those primitives have been rendered, or until at least some of the processing involved in rendering the primitives (e.g. HSR and/or texturing and shading) has been performed, at which point the portions of the cache 336 may be unlocked.

Computation instances continue to be allocated to tasks in the task assembly unit 340 until, in step S416, the task assembly unit 340 determines that a task is to be output for execution. In step S418 one or more tasks are selected and output from the task assembly unit 340 for execution by the SIMD processing logic 346.

There are many reasons for the task assembly unit 340 to determine that a task is to be output for execution. For example, a particular task may be output for execution in response to the particular task being full (i.e. it has no more available slots for allocation of further computation instances). In the example shown in FIG. 6 if eight computation instances have been allocated to the particular task then it is considered full.

As another example, a particular task may be output for execution in response to a new task entry for a new task being ready to be written to the task assembly unit 340 when the task assembly unit 340 does not have available space for a new task entry. In this case, the particular task is output so that the new task entry can be written into the task assembly unit 340.

As another example, a particular task may be output for execution in response to a further task, which has one or more dependencies on the particular task, being due to be executed (e.g. because it is full or some other reason). In this case the particular task is output for execution because its results are needed for the execution of the other task(s). The dependencies may be indicated by the task dependency unit 342 as described above.

As another example, a particular task may be output for execution in response to a flush of a rendering queue which includes a primitive to which the particular task relates. When the rendering queue 344 is flushed a request may be sent to the cache system 334 for retrieving graphics data items from the cache 336 relating to primitives to be processed for rendering. That is, when the rendering queue 344 is flushed then all of the primitives indicated in the rendering queue 344 are to be processed by the primitive processing logic 317, and as such all of the tasks locked for the corresponding primitive processing pipeline need to be flushed. This guarantees data for all the graphics data items relating to the primitives which are to be processed is available in the cache (rather than in a "scheduled" state).

In cases where some, but not all, of the tasks in the task assembly unit 340 are to be output to the SIMD processing logic 346 then a selection scheme may be used to select the tasks to be output. For example, the task assembly unit 340 may select the fullest task for which a task entry is stored in the task assembly unit 340 to be output for execution. This means that tasks which are executed by the SIMD processing logic 346 contain more computation instances, on average, than if other tasks were selected to be output. Another possible scheme is selecting the oldest task. The selection scheme might also favour tasks that have no input dependencies, to avoid prematurely flushing several tasks. Generally, increasing the average number of computation instances in tasks executed by the SIMD processing logic 346 will increase the efficiency of the SIMD processing (in terms of the rate at which computation instances are executed).

When a task is outputted from the task assembly unit 340, the task assembly unit 340 makes the corresponding task entry available for another task.

Figures 7, 8:
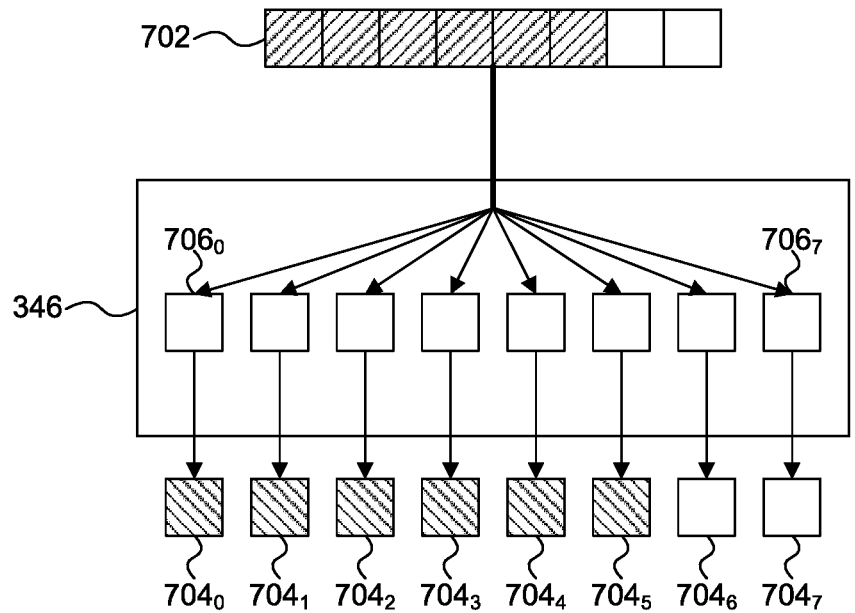
FIG. 7 illustrates execution of a task by SIMD processing logic.
FIG. 8 represents a task assembly unit in an example.

In step S420 the SIMD processing logic 346 executes the computation instances of each of the one or more outputted tasks in a SIMD manner. FIG. 7 illustrates how the computation instances of a task can be executed by the SIMD processing logic 346. A task 702 is capable of including eight computation instances, but in the example shown in FIG. 7 the task 702 includes six computation instances (shown with hatching in FIG. 7). The task 702 is provided to the SIMD processing logic 346 for execution. The SIMD processing logic 346 comprises a plurality of execution units 706, which may be referred to as Arithmetic Logic Units (ALUs) each of which is configured to execute an instruction on data for respective computation instances of a task in parallel. In FIG. 7 there are eight execution units, where for clarity only two of the execution units have reference numerals in FIG. 7: $706_0$ and $706_7$. The number of execution units 706 in the SIMD processing logic 346 may be different in different examples. For example, the number of execution units 706 in the SIMD processing logic 346 may equal the maximum number of computation instances which can be included in a single task. The results ($704_0$ to $704_7$) from the respective execution units ($706_0$ to $706_7$) are graphics data items (e.g. vertices of primitives) that are provided to the cache system 334 for storage in the respective allocated portions of the cache 336. Recall that the space in the cache 336 for each of the graphics data items was allocated during a query in step S412 and locked for one or more graphics processing pipelines.

In step S422 the execution results are stored in the cache 336. In this way the graphics data items for primitives to be processed for rendering can be generated and stored in the cache 336.

In a simple example in which primitives go through the vertex shader stage but do not go through the tessellation and geometry shader stages, the vertices of the primitives are searched for in the VS LUT 602. For each cache miss, a vertex shader instance is queued in the task assembly unit 340. The entries in the VS LUT 602 are locked for the current tile processing pipeline regardless of whether a cache hit or a cache miss occurred. Moreover, on a hit, if the entry in the VS LUT is marked as scheduled for execution, the task it is scheduled on is also locked for the current tile processing pipeline. This will guarantee that the tasks are sent to execution before flushing the rendering queue.

In another example in which primitives go through the vertex shader stage and the tessellation stage but not through the geometry shader stage, vertices are searched for in the DS LUT 606. If at least one cache miss occurred, the patch data is searched for in the HS LUT 604. If at least one DS miss occurred and the HS output is not available, the input control points are searched for in the VS LUT 602. To handle misses at the VS stage, the corresponding VS instances are queued in the task assembly unit 340. Analogously, to handle a miss at the HS stage, the relevant HS instance is added to the task assembly unit 340 with indications of dependencies to the tasks executing the VS instances which provide the HS input being added to the task dependency unit 342. Furthermore, to handle misses at the DS stage, the DS instances are added to the task assembly unit 340 with an indication of a dependency to the task executing the HS instance which provides the DS input being added to the task dependency unit 342. Moreover, at each of the shader stages, if a hit occurs but the entry in the relevant LUT is marked as scheduled for execution, the task it is scheduled on is locked for the current tile processing pipeline. This will guarantee that the tasks are sent to execution before flushing the rendering queue.

Different conditions can trigger a flush of the rendering queue 344 for one of the tiles being processed: (1) the queue is full, (2) the locks in the cache need to be released or (3) the untransformed geometry fetch unit 316 has completed fetching the geometry for the tile. Recall that at this point all the graphics data items for the primitives in the rendering queue will still be stored in the cache 336, because they have been locked after step S412. Before proceeding with the rasterization and HSR of the primitives in the queue, the system has to output for execution the SIMD task locked during step S414. The tasks can be sorted by state so that the SIMD processing logic 340 does not need to change its execution state as frequently between executing tasks. This may improve the efficiency of the SIMD processing.

After flushing the required SIMD tasks, the graphics data items for the primitives in the rendering queue become available. For each primitive in the queue, in step S424, a request is sent to the cache system 334 to retrieve the vertices from the referenced graphics data items. It is noted that a vertex can be a part of a graphics data item (e.g. a geometry shader data item may contain many vertices). The primitive is then sent to the primitive processing logic 317. After all the primitives in the queue are processed, the locks on the graphics data items required for this tile are released. Observe, however, that the same graphics data items might still be locked by other tiles.

The primitive processing logic 317 then renders the primitives which have been flushed from the rendering queue 344 using graphics data items which are stored in the cache 336. In particular, in step S426, the clip and transform logic 330 performs clipping and transform operations on the graphics data items retrieved from the cache 336. As described above, in this example, the primitives for which primitive descriptors are stored in the rendering queue 344 are clipper input primitives, i.e. primitives to which clipping has not yet been applied, which is why clipping is performed by the primitive processing logic 317. In other examples, the primitive processing logic 317 might not include clipping functionality if the primitives have had clipping applied to them before arriving at the primitive processing logic 317. The transform operations are viewport transformations for transforming the primitives into the 2D rendering space. The clipped and transformed primitives are provided to the HSR unit 318.

In step S428 the primitives are rendered by the HSR unit 318 and the texturing/shading unit 320, to thereby generate a rendering output for the particular tile. The HSR unit 318 removes primitive fragments which are hidden, and the texturing/shading unit 320 applies one or both of texturing and shading to primitive fragments. However, in other examples, different processing may be performed to render the primitives which are output from the clip and transform logic 330. Furthermore, the example system 300 shown in FIG. 3 is a deferred rendering system in the sense that hidden surface removal is performed on a primitive fragment prior to texturing and/or shading of the primitive fragment. In other examples the system might not be a deferred rendering system such that hidden surface removal is performed on a primitive fragment subsequent to texturing and/or shading of the primitive fragment.

In step S430 the resulting rendered pixel values are provided to the memory 302 for storage in the frame buffer 328 and can subsequently be used, e.g. displayed on a display or stored in memory or transmitted to another device, etc.

In the examples described above the input graphics data items (which may for example be primitives or control points describing patches) describe geometry within a 3D scene to be rendered, wherein the rendered primitives are for use in forming a rendered image of the scene. In other examples, the rendered primitives may be for other uses than forming a rendered image of a scene. For example, the input graphics data items may describe a texture, and the rendered primitives may be for use in forming a rendered image and subsequently to be used as a texture in other renders.

In the examples described above, the task dependency unit 342 includes the matrix 612. FIG. 8 shows another example in which the task dependency unit 342 includes a table 802 which indicates, for different states (A, B, C, etc.), which task entries are stored in the task assembly unit 340 for different shader types (VS, HS, DS, GS, etc.). For example, FIG. 8 shows that task entry 0 is for vertex shader instances having state A, task entry 1 is for vertex shader instances having state B, task entry 2 is for domain shader instances having state C, task entry 3 is for hull shader instances having state C, and task entry 4 is for vertex shader instances having state C. Since there are no task dependencies across different draw calls and since states can only change between draw calls, there is no dependencies across different rows of table 802. The dependencies are implicit within a row of table 802. For example it is implied by the table 802 that task entry 2 is dependent upon task entry 3 which itself is dependent upon task entry 4, because the order of the shader stages is univocally defined. In other examples, the table 802 may include more than one column for a particular shader type, e.g. there may be more than one domain shader column because many DS instances can be generated from a single HS instance. Since the DS tasks will fill up much quicker than the HS task on which they depend, allowing for multiple open DS tasks prevents premature flushing of the HS and, indirectly, VS tasks. For instance, consider a system where each SIMD process is 32-wide. If we encounter one HS instance generating 32 DS instances and we only allow one outstanding DS task per state, we will have to flush the DS task as soon as it fills up. To provide the input of the DS task, we also have to flush the HS task. Since the untransformed primitive fetch unit might not have discovered other compatible HS instances yet, this may cause execution of the HS instance at only 1/32 efficiency. If, on the other hand, we allow multiple outstanding DS tasks, we will have higher chances to discover more compatible HS instances from the same tile or from other concurrently processed tiles. It is noted that the problem does not occur between the VS and the HS stages since the VS always fills up more quickly than the HS. If the system allows multiple DS tasks for the same shader stage, an extra bit per task can indicate the dependency of the task on the currently outstanding HS task at the preceding stage.

In summary of the examples described above the efficiency of the SIMD processing of computation instances for generating graphics data items is improved compared to a system which does not implement a task assembly unit. The use of the task assembly unit 340 is particularly useful in the rasterisation phase because primitives to be processed in the rasterisation phase are retrieved from the cache 336 in a bottom-up manner and because (in a tile-based rendering system) tiles of the rendering space are processed in the rasterisation phase rather than processing the whole rendering space at once. In other words, the continuous stream of primitives in the geometry phase is stripped of the culled primitives and broken down into a stream of primitives per tile, which is then processed in the rasterisation phase in a timing-dependent order (i.e. the primitives in a tile are processed in-order, but the tiles can be processed in any order), with sharing among them (e.g. primitives can share vertex data within the same tile and across tiles). Each miss in the cache 336 results in the execution of a computation instance. In order to exploit the SIMD nature of the GPU, multiple computation instances are gathered together to execute in a single SIMD task. Since a task can be up to N computation instances wide, where N depends on the microarchitecture, it is desirable to gather N compatible computation instances for execution before executing a task. Shader instances may be considered to be compatible if they belong to the same pipeline stage (e.g. VS, HS, DS or GS) and share the same state or a compatible state. A further consideration is that computation instances that belong to different pipeline stages might have dependencies with each other. For example, a geometry shader instance that consumes a triangle depends on three vertex or domain shader instances, while a domain shader instance may depend on a single hull shader instance. The use of the task dependency unit 342 helps to ensure that the dependencies of a task are satisfied before its execution. In the examples described herein the task assembly unit 340 allows tasks for different shader stages and requiring different graphics state to be assembled simultaneously into different tasks. Moreover, the tasks can be filled up with computation instances requested by multiple tile processing pipelines. That is, the task assembly unit 340 may allocate computation instances relating to different tiles to a common task.

As computation instances are assembled into open tasks in the task assembly unit 340, data is stored for each computation instance to identify the inputs and outputs of that computation instance. Each computation instance is defined by the shader type and state (e.g. the specific shader program), which is common to each computation instance in a task, and the inputs and outputs, which may be unique to each computation instance, and which define the graphics data items that are operated on. Each input or output is identified by a reference into the lookup table or tables (LUTs) of the cache controller 338, in order to identify the locations in the cache where input data may be found, and where output data should be written. For example, in a system with 8192 LUT entries, each input or output can be identified using a 13 bit number, as $\log_2(8192)=13$. The output of a computation instance in one task may correspond to an input of a computation instance in another task. In this way the interconnections between computation instances form a hierarchy of processing stages such as the one illustrated in FIG. 5.

The amount of data stored for the open tasks in the task assembly unit 340 may become significant, such that schemes for reducing the amount of data stored for the open tasks may be beneficial. For example, the task assembly unit 340 may be able to store up to 128 tasks, and each task may have up to 32 computation instances. Each computation instance can have up to 33 inputs (e.g. 32 VS inputs and one HS input for a DS computation instance). In a naïve solution, where there are 8192 (i.e. $2^{13}$) LUT entries then the amount of data needed to store the references, in a worst case, in this example, is 221 KB (i.e. 128 tasks×32 instances×(1 output+33 inputs)×$\log_2(8192)$=1810432 bits=226304 bytes=221 KB). This is a large amount of data to store in the tile assembly unit 340 for references used by the computation instances in the open tasks.

Figures 11, 12:
FIG. 11 illustrates input and output references for computation instances of a task.
FIG. 12 illustrates a table of task slots for storing input and output references for computation instances of tasks.

A first option for reducing the amount of storage needed for the references of the computation instances is to allow the sharing of inputs across instances in the same task and to encode the sharing using a mapping table. This takes advantage of the fact that most inputs are shared among instances of the same task. For example, a task of 32 computation instances may include 32 instance outputs (1 output per computation instance) and up to 64 distinct inputs which can be referenced by any of the computation instances in the task. For each of these inputs/outputs a 13 bit identifier is stored to identify a LUT entry. As described above, each computation instance may have up to 33 inputs, and for each of these inputs, a 6 bit index is used to identify one of the 64 inputs of the task. FIG. 11 shows the reference data that may be stored for a task: there are 32 instance outputs (o0 to o31), up to 64 task inputs (i0 to i63), and up to 33 instance input indexes for each of 32 computation instances in the task. Each input index is a 6 bit index identifying one of the task inputs. As mentioned above, in an example, there may be 128 open tasks in the task assembly unit 340, so the amount of data needed to store the references in a worst case, in this example, is 118.5 KB (i.e. 128 tasks×[(32 outputs+64 inputs)×$\log_2(8192)$+(32×33×6 bits)]=970752 bits=121344 bytes=118.5 KB). Although this is a reduction in the amount of data stored compared to the naïve approach described above, we can save more data in the options described below. Furthermore, in this option the task assembly unit 340 may need to search the inputs of the open tasks before adding a computation instance to a task to see if the inputs of the computation instance are already present in an open task.

In a second option, instead of every task taking one task slot, tasks take a different number of slots depending on the number of inputs for the computation instances in the task. For example, as mentioned above, the VS inputs might not be stored in the cache 336, and may instead be read as a normal memory read, e.g. from a system level cache, and as such a VS task may have 32 outputs and 32×0 inputs, so 1 task slot is used; a GS task has 32 outputs and 32×3 inputs, so 4 task slots are used; a HS task has 32 outputs and 32×32 inputs, so 33 task slots are used; and a DS task has 32 outputs and 32×1 HS inputs and 32×4 VS inputs, so 6 task slots are used. A reduction in the amount of storage required comes from appreciating that the worst-case storage requirement comes from HS tasks (which require 33 task slots each) but that in practice it is only necessary to provide storage for a more realistic workload in which tasks are distributed between the different shader types. If instead we provide enough task slots to handle up to 128 DS tasks, each taking 6 task slots, a table of 768 task slots is stored. FIG. 12 shows an example table 1200 which can be stored. Each row of the table 1200 represents a task slot. There can be up to 768 task slots, and each task slot includes 32 input or output references, each of 13 bits, so the total number of reference bits stored in the table can be up to 768×32×13=319488 bits=39 KB. Therefore, this option provides a significant reduction in the storage required for references without the addition of complicated data structures, but it may complicate the management of the task table, and there is the possibility of fragmentation of the tasks.

In a third option, a primitive table can be stored that maps each input primitive (or patch) to the VS instances that produce its vertices (or control points). The primitive table is stored in addition to the task table. Every entry in the primitive table stores up to 32 vertices per primitive, which is the maximum number of control points for a patch. In the task table, for each instance in a HS/DS/GS task, we only need to store the input primitive index, rather than up to 32 references to the input vertices or control points. These references can be obtained by using the primitive index to perform a lookup in the primitive table. When adding a HS, DS or GS instance, the task assembly unit 340 searches the primitive table for its input primitive. If the primitive is not found in the primitive table then the primitive is added to the primitive table. A primitive is evicted from the primitive table when all of the tasks with instances referring to the primitive have been flushed. To achieve this, a reference count can be stored in each row of the primitive table and updated when a task that reads the vertices of that primitive is created (increment reference count) or flushed (decrement reference count). As an example, there may be up to 256 primitives with tasks in flight at a given time. FIG. 13 shows an example of a task table 1302 which stores references to primitives stored in a primitive table 1304 for inputs and outputs of computation instances within HS, DS and GS tasks. The tag of table 1304 is the LUT reference to the output of a GS or HS instance that processes the primitive. The table can be implemented as set associative or fully associative. Each row stores up to 32 LUT references to the vertices of the primitive, which are generated by VS instances and provide the input to the HS or GS instance identified by the tag. For example, the instance 0 of the HS task 0 processes the primitive in the LUT entry 6991, and the primitive table 1304 indicates LUT references for the vertices of that primitive. Before running the HS task, the VS instances producing those vertices will need to be identified (through the primitive table) and their data read from the cache. The task table 1302 does not store input references for VS, HS or GS tasks. That is, the task table 1302 stores only the output references for VS tasks (since they are the first shader stage, such that their inputs do not need to be stored) and HS/GS tasks (since their inputs can be determined by a lookup in the primitive table). However, for DS tasks, references to the HS outputs are also required. When the DS reads the input control points generated by the VS, the references are obtained by performing a lookup of the HS reference in the primitive table. With a limit of 128 open tasks and 256 primitives with open tasks, the task table 1302 requires 13 KB (i.e. 128 tasks×(32 outputs+32 HS references)×13 bits=106496 bits=13 KB) and the primitive table 1304 requires ~14 KB (i.e. 256 primitives×(1 HS/GS reference×13 bits+32 VS references×13 bits+log 2 128 bits for the reference count)=256×436 bits=13.625 KB). For a table with at most 256 primitives, this amounts to ~14 KB of storage. Therefore, this option provides a significant reduction in the storage required for references, but it requires maintaining and updating another table (the primitive table).

In a fourth option, the input references are stored in the cache 336, not in the task table. The output references are still stored in the task table in this example. As described above there is one output reference per computation instance of each task. The output reference for a shader instance identifies a portion of the cache 336: for a scheduled instance, that portion of the cache contains an input descriptor with references to the inputs of the scheduled instance; and for ready (or "available") instances that portion of the cache contains the output data produced by the instance. Normally, the output data replaces the input descriptor, but sometimes the output data and the input descriptor is preserved after the shader execution and stored alongside the output data. When setting up a task for execution, the input descriptors of each instance in the task are read. Using the input references stored in the input descriptors, the inputs of the instance (e.g., the VS outputs for a HS instance) are read from the cache. Once all the inputs of all instances in the task have been read, the task can be executed. If the input descriptor can be discarded after a task is output for execution, the size of the storage for a shader instance is the maximum of the input descriptor size and the output size. If the input descriptor cannot be discarded after a task is output for execution, the size of the storage for a shader instance is the input descriptor size plus the output size. The only case when an input descriptor is not discarded is when the DS directly reads the VS inputs because the HS does not modify the control points: in this case, the DS input descriptor points to the HS input descriptor which, in turns, points to the VS outputs. Therefore, the HS input descriptor has to be stored even after the HS is run. As an example in which there are 128 open tasks stored in the task assembly unit 340, the amount of data needed in the task assembly unit 340 to store the references, in this example, is 6.5 KB (i.e. 128 tasks×32 outputs×13 bits=53248 bits=6.5 KB). Therefore, very little storage is needed in the task assembly unit 340, but in this option more time may be needed to setup tasks, and there may be problems of pointer chasing and possibly more read throughput may be needed for the shader data storage. Alternatively, to reduce the amount of pointer chasing for the DS, the task table may contain, for each DS instance in a DS task, a reference to the HS. Therefore, the HS input descriptor can be read before accessing the DS input descriptor. In this case the task table will take 13 KB as in the third option (i.e. 128 tasks×(32 outputs+32 HS references)×13 bits=106496 bits=13 KB).

So there are a number of options for reducing the amount of data of the tile assemble unit 340 used to store references used by the computation instances in the open tasks.

Figure 9:
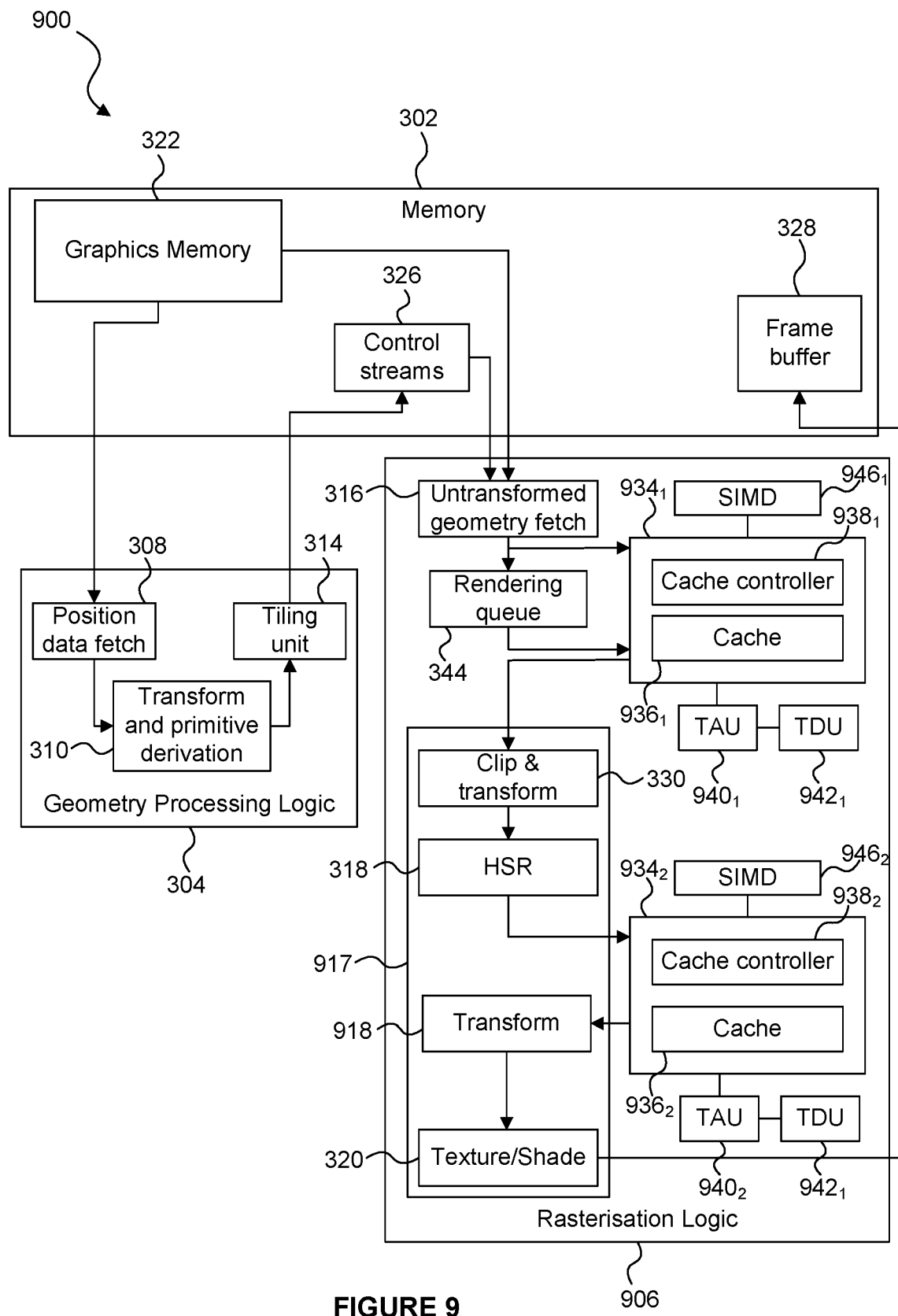
FIG. 9 shows a graphics processing system according to alternative embodiments.

In the examples described above, the cache system 334 is implemented in the rasterisation logic 306 prior to the HSR unit 318 and the texturing/shading unit 320 in the processing pipeline. In some other examples, e.g. in system 900 as shown in FIG. 9, the cache system may be implemented in two cache subsystems $934_1$ and $934_2$, along with respective processing subsystems, the first of which comprises a task assembly unit $940_1$, a task dependency unit $942_1$ and SIMD processing logic $946_1$, and the second of which comprises a task assembly unit $940_2$, a task dependency unit $942_2$ and SIMD processing logic $946_2$. The first subsystems ($934_1$, $940_1$, $942_1$ and $946_1$) are implemented before the clip and transform logic 330 and the HSR unit 318; and the second subsystems ($934_2$, $940_2$, $942_2$ and $946_2$) are implemented after the clip and transform logic 330 and the HSR unit 318 (but before the texturing/shading unit 320) in the processing pipeline. The components shown in FIG. 9 which have the same reference numerals as those in FIG. 3 operate in the same manner. The first cache subsystem $934_1$ includes a first cache $936_1$ and a first cache controller $938_1$; and the second cache subsystem $934_2$ includes a second cache $936_2$ and a second cache controller $938_2$. In these examples, the first subsystems ($934_1$, $940_1$, $942_1$ and $946_1$) may be configured to operate only on the position data of the graphics data items, and to store the positions of the sub-primitive in the hierarchical cache $936_1$ of the first subsystem as described above. The task assembly unit $940_1$, task dependency unit $942_1$ and SIMD processing logic $946_1$ operate in accordance with the examples described above to determine position data for sub-primitives. The HSR unit 318 only operates on position data so there is no need to transform non-position attributes prior to the operation of the HSR unit 318. For graphics data items that are output from the HSR unit 318 (i.e. not removed by the HSR unit 318) the second subsystems ($934_2$, $940_2$, $942_2$ and $946_2$) operate on non-position attributes (and optionally on position attributes), wherein the results of the sub-primitive derivation may be stored in the hierarchical cache $936_2$ of the second subsystem as described above. The task assembly unit $940_2$, task dependency unit $942_2$ and SIMD processing logic $946_2$ operate in accordance with the examples described above to determine non-position attributes of sub-primitives. In this way, non-position attributes are computed by the SIMD processing logic $946_2$ only for primitives not culled by HSR. In the second subsystem ($934_2$, $940_2$, $942_2$ and $946_2$), the position of primitives can either be computed again or read from the cache $936_1$ of the first subsystem. A transform unit 918 is used to transform the non-position attributes (and possibly the position attributes also) of primitives into the rendering space. The primitives are then provided to the texturing/shading unit 320 for processing as described above.

Figure 10:
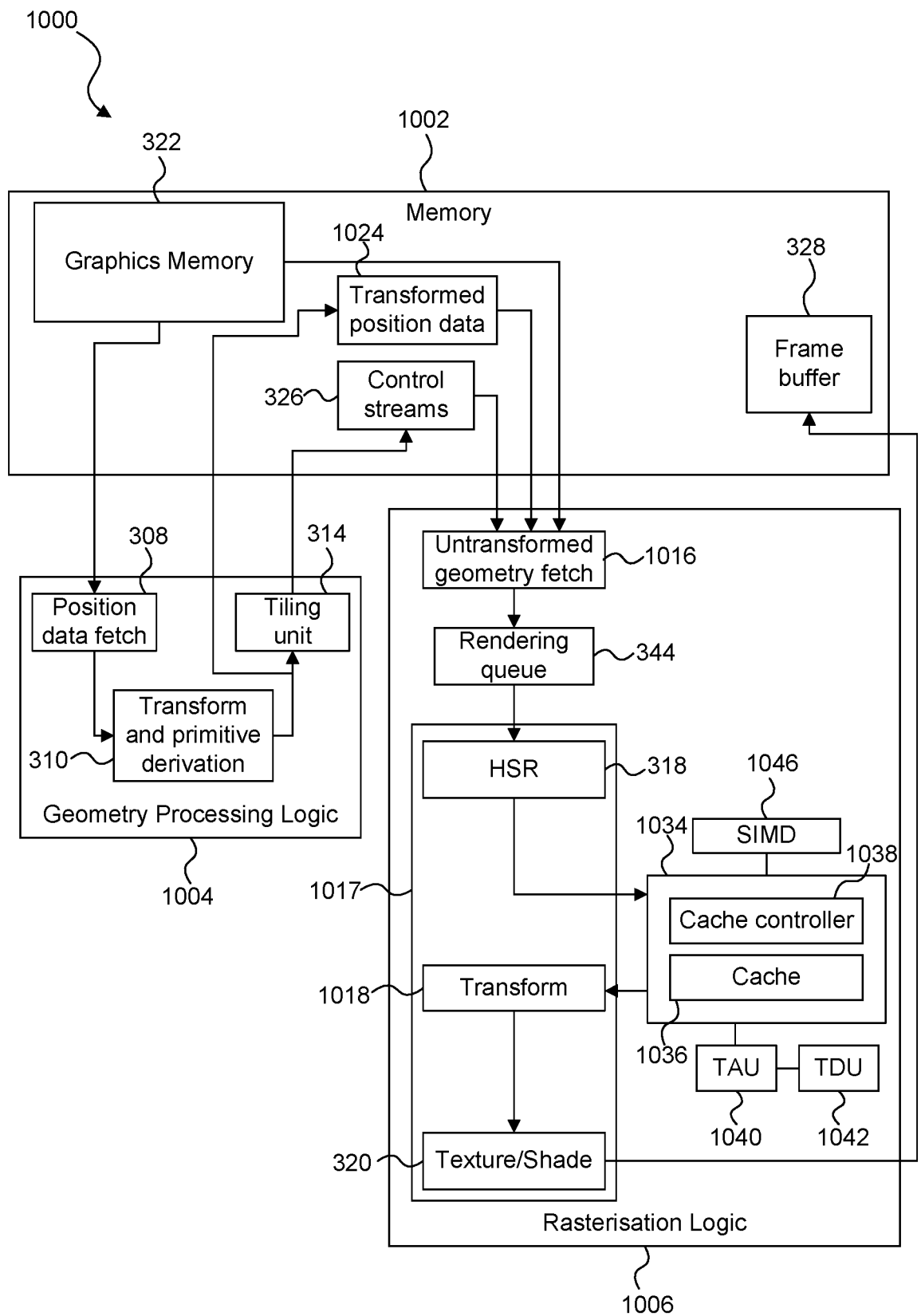
FIG. 10 shows a graphics processing system according to further alternative embodiments.

In further examples, e.g. in system 1000 as shown in FIG. 10, the cache system 1034 and the task assembly unit 1040, task dependency unit 1042 and SIMD processing logic 1046 may be implemented after the HSR unit 318 but before the texturing/shading unit 320 in the processing pipeline. In these examples, the geometry processing logic 1004 is similar to the geometry processing logic 304 but can send transformed position data for primitives and sub-primitives for storage in the memory 1002 (e.g. in a transformed position buffer 1024) with the control streams. The fetch unit 1016 is similar to the fetch unit 316, but can fetch the transformed position data for primitives indicated as being in a particular tile by the control stream data for the particular tile. The HSR unit 318 can operate on the position data for performing hidden surface removal. The primitives output from the HSR unit 318 (i.e. on primitives not culled by HSR) are passed to the cache system 1034 which comprises a cache 1036 and a cache controller 1038 and which is configured to store non-position attributes of primitives. The cache system 1034 operates in a similar manner to the hierarchical cache system 334 described above and can store non-position attributes of primitives that are outputted from the HSR unit 318. The task assembly unit 1040, task dependency unit 1042 and SIMD processing logic 1046 operate in accordance with the examples described above to determine non-position attributes of sub-primitives. Data (position and non-position attributes) for primitives can be provided to a transform unit 1018 which transforms the non-position attributes (and possibly the position attributes also) of primitives into the rendering space. The primitives are then provided to the texturing/shading unit 320 for processing as described above. The hierarchical cache system 1034 may operate according to the principles described above in relation to the cache system 334.

In a further alternative, transformed position data may be stored after the geometry processing phase (e.g. in a transformed position buffer 1024) for some primitives, whilst for other primitives untransformed position data is stored. For example, transformed position data could be stored in memory for simple primitives, but we can avoid the memory consumption in main memory of storing a large number (e.g. millions) of primitives which may be generated by tessellation by storing the position data for these primitives in an untransformed state.

Figure 14:
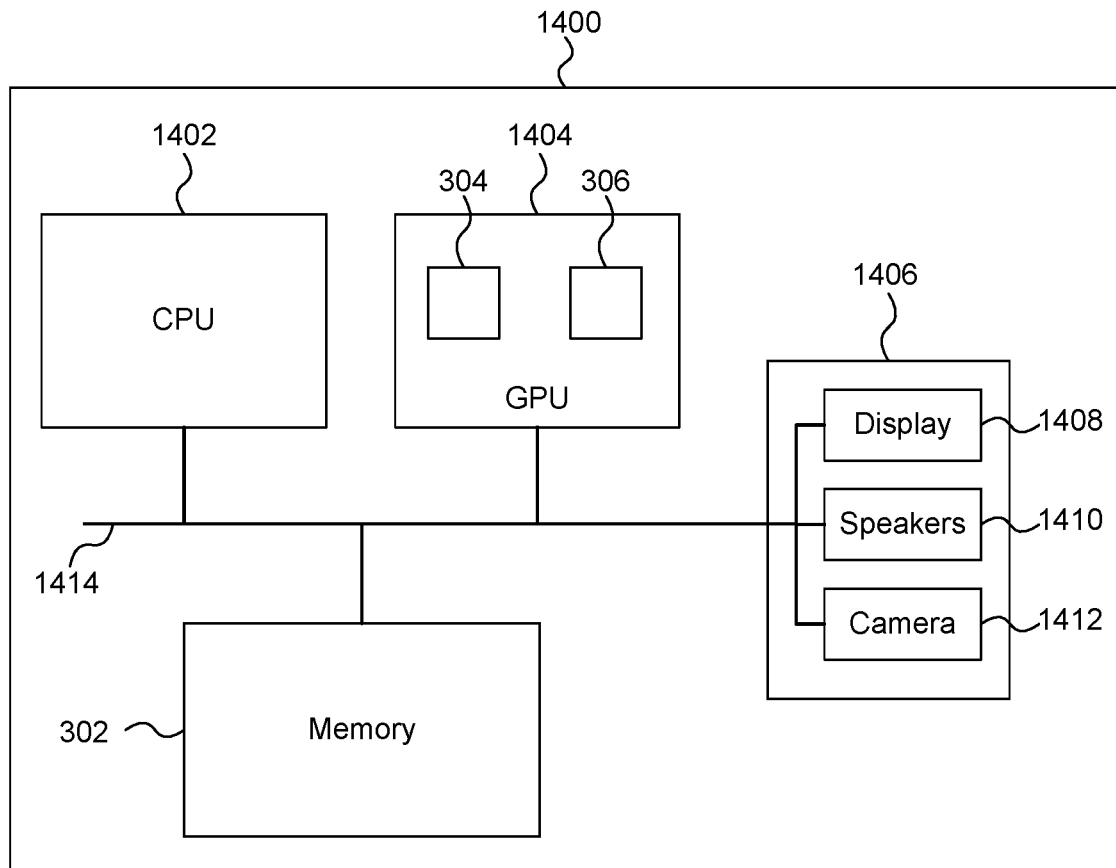
FIG. 14 shows a computer system in which a graphics processing system is implemented.

FIG. 14 shows a computer system in which the graphics processing system 300 may be implemented. The computer system comprises a CPU 1402, a GPU 1404, a memory 302 and other devices 1406, such as a display 1408, speakers 1410 and a camera 1412. The geometry processing logic 304 and the rasterisation logic 306 are implemented on the GPU 1404. In other examples, the geometry processing logic 304 and the rasterisation logic 306 may be implemented on the CPU 1402. The components of the computer system can communicate with each other via a communications bus 1414.

In the examples described above the primitives are rendered using a rasterisation process. In other examples, primitives may be rendered using other techniques such as ray tracing. In these other examples, the cache system 334, task assembly unit 340, task dependency unit 342 and SIMD processing logic 346 may operate based on the same principles as described in the examples above, such that computation instances are gathered into tasks to be output to SIMD processing logic 346.

Generally, any of the functions, methods, techniques or components described above (e.g. the components of the geometry processing logic 304 and of the rasterisation logic 306) can be implemented in modules using software, firmware, hardware (e.g., fixed logic circuitry), or any combination of these implementations. The terms "module," "functionality," "component", "block", "unit" and "logic" are used herein to generally represent software, firmware, hardware, or any combination thereof.

In the case of a software implementation of some of the components of the geometry processing logic 304 and of the rasterisation logic 306, those components represent program code that perform specified tasks when executed on a processor. In one example, units and logic of the geometry processing logic 304 and rasterisation logic 306 may be performed by a computer configured with software in machine readable form stored on a computer-readable medium. One such configuration of a computer-readable medium is signal bearing medium and thus is configured to transmit the instructions (e.g. as a carrier wave) to the computing device, such as via a network. The computer-readable medium may also be configured as a non-transitory computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The software may be in the form of a computer program comprising computer program code for configuring a computer to perform the constituent portions of described methods or in the form of a computer program comprising computer program code means adapted to perform all the steps of any of the methods described herein when the program is run on a computer and where the computer program may be embodied on a computer readable medium. The program code can be stored in one or more computer readable media. The features of the techniques described herein are platform-independent, meaning that the techniques may be implemented on a variety of computing platforms having a variety of processors.

Those skilled in the art will also realize that all, or a portion of the functionality, techniques or methods described herein may be carried out by a dedicated circuit, an application-specific integrated circuit, a programmable logic array, a field-programmable gate array, or the like. For example, the module, functionality, component, unit or logic (e.g. the components of the geometry processing logic 304 and of the rasterisation logic 306) may comprise hardware in the form of circuitry. Such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnects, by way of example. Such elements may be provided as custom circuits or standard cell libraries, macros, or at other levels of abstraction. Such elements may be interconnected in a specific arrangement. The module, functionality, component, unit or logic (e.g. the components of the geometry processing logic 304 and of the rasterisation logic 306) may include circuitry that is fixed function and circuitry that can be programmed to perform a function or functions; such programming may be provided from a firmware or software update or control mechanism. In an example, hardware logic has circuitry that implements a fixed function operation, state machine or process.

It is also intended to encompass software which "describes" or defines the configuration of hardware that implements a module, functionality, component, unit or logic (e.g. the components of the geometry processing logic 304 and of the rasterisation logic 306) described above, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed in an integrated circuit manufacturing system configures the system to manufacture a graphics processing system configured to perform any of the methods described herein, or to manufacture a graphics processing system comprising any apparatus described herein. The IC definition dataset may be in the form of computer code, e.g. written in a suitable HDL such as register-transfer level (RTL) code. An example of processing an integrated circuit definition dataset at an integrated circuit manufacturing system so as to configure the system to manufacture a graphics processing system will now be described with respect to FIG. 15.

Figure 15:
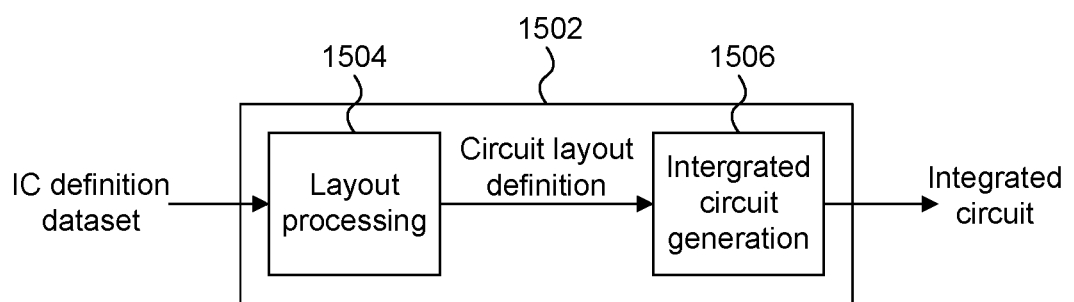
FIG. 15 shows an integrated circuit manufacturing system for generating an integrated circuit embodying a graphics processing system.

FIG. 15 shows an example of an integrated circuit (IC) manufacturing system 1502 which comprises a layout processing system 1504 and an integrated circuit generation system 1506. The IC manufacturing system 1502 is configured to receive an IC definition dataset (e.g. defining a graphics processing system as described in any of the examples herein), process the IC definition dataset, and generate an IC according to the IC definition dataset (e.g. which embodies a graphics processing system as described in any of the examples herein). The processing of the IC definition dataset configures the IC manufacturing system 1502 to manufacture an integrated circuit embodying a graphics processing system as described in any of the examples herein. More specifically, the layout processing system 1504 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1504 has determined the circuit layout it may output a circuit layout definition to the IC generation system 1506. The IC generation system 1506 generates an IC according to the circuit layout definition, as is known in the art. For example, the IC generation system 1506 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1506 may be in the form of computer-readable code which the IC generation system 1506 can use to form a suitable mask for use in generating an IC. The different processes performed by the IC manufacturing system 1502 may be implemented all in one location, e.g. by one party. Alternatively, the IC manufacturing system 1502 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a graphics processing system without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some examples, an integrated circuit definition dataset could include software which runs on hardware defined by the dataset or in combination with hardware defined by the dataset. In the example shown in FIG. 15, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The term 'processor' and 'computer' are used herein to refer to any device, or portion thereof, with processing capability such that it can execute instructions, or a dedicated circuit capable of carrying out all or a portion of the functionality or methods, or any combination thereof.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It will be understood that the benefits and advantages described above may relate to one example or may relate to several examples.

Any range or value given herein may be extended or altered without losing the effect sought, as will be apparent to the skilled person. The steps of the methods described herein may be carried out in any suitable order, or simultaneously where appropriate. Aspects of any of the examples described above may be combined with aspects of any of the other examples described to form further examples without losing the effect sought.

What is claimed is:

1. A graphics processing system configured to render an image, the graphics processing system comprising:
    a task assembly unit configured to:
        store a plurality of task entries for respective tasks to which computation instances can be allocated, the computation instances being for generating graphics data items for use in rendering the image, wherein a computation instance has one of the following shader types: (i) vertex shader, (ii) hull shader, (iii) domain shader, and (iv) geometry shader, and wherein the task entries are associated with shader types,
        allocate, to a task, a computation instance to be executed, based on the shader type of the computation instance, and
        output one or more tasks for execution; and
    processing logic configured to execute computation instances of a task outputted from the task assembly unit to thereby generate graphics data items for use in rendering the image;
    wherein the graphics processing system is configured to render the image using the generated graphics data items.

2. The graphics processing system of claim 1, further comprising a task dependency unit configured to maintain indications of dependencies between different tasks for which task entries are stored in the task assembly unit.

3. The graphics processing system of claim 2, wherein the task assembly unit is configured to output a particular task for execution in response to a further task, which has one or more dependencies on the particular task, being due to be executed.

4. The graphics processing system of claim 2, further configured to use the task dependency unit to ensure that the dependencies of a task are satisfied before it is executed.

5. The graphics processing system of claim 2, wherein the task dependency unit includes a matrix to indicate which tasks, if any, each task entry to be executed is dependent upon.

6. The graphics processing system of claim 2, wherein the task dependency unit includes a table to indicate, for different states, which task entries are stored in the task assembly unit for different shader types.

7. The graphics processing system of claim 1, further comprising a cache configured to store a hierarchy of graphics data items, wherein graphics data items defining primitives to be rendered are derivable from one or more input graphics data items via a sequence of one or more processing stages implemented by executing computation instances.

8. The graphics processing system of claim 7, wherein the sequence of processing stages are implemented by executing computation instances having one or more of the following shader types: (i) vertex shader, (ii) hull shader, (iii) domain shader, and (iv) geometry shader.

9. The graphics processing system of claim 7, configured to retrieve graphics data items from the cache in a bottom-up manner.

10. The graphics processing system of claim 7, wherein said hierarchy includes one or both of: (i) one or more of the input graphics data items, and (ii) one or more graphics data items representing results of processing stages of the sequence.

11. The graphics processing system of claim 7, wherein the cache is part of a cache system which is configured to determine whether graphics data items are present in the cache, wherein the task assembly unit is configured to allocate a computation instance to a task if the computation instance is for generating a graphics data item which is determined by the cache system as being not present in the cache.

12. The graphics processing system of claim 11, wherein the cache system is further configured to allocate portions of the cache to each of the computation instances allocated to tasks in the task assembly unit.

13. The graphics processing system of claim 7, wherein graphics data items generated by the processing logic are for storage in the cache, and wherein the graphics processing system is configured to render the image using the generated graphics data items stored in the cache.

14. The graphics processing system of claim 1, wherein the processing logic is SIMD processing logic configured to execute computation instances of a task in a SIMD manner.

15. The graphics processing system of claim 1, wherein the task entries are further associated with states, wherein the task assembly unit is configured to allocate a computation instance to a task, further based on the state of the computation instance.

16. The graphics processing system of claim 1, wherein the graphics processing system is a tile-based graphics processing system configured to use a rendering space which is subdivided into a plurality of tiles, and wherein the graphics processing system is configured to implement a geometry processing phase and a rasterisation phase;

wherein the geometry processing phase comprises: (i) receiving graphics data of input graphics data items, (ii) determining transformed positions within the rendering space of one or more primitives derived from the input graphics data items, and (iii) generating, for each of the tiles, control stream data including identifiers of input graphics data items which are to be used for rendering the tile, and primitive indications to indicate which of the primitives derived from the input graphics data items are to be used for rendering the tile; and wherein the rasterisation phase comprises: (i) receiving the control stream data for a particular tile; and (ii) generating graphics data items for use in rasterising primitives which the primitive indications of the received control stream data indicate are to be used for rendering the tile.

17. The graphics processing system of claim 1, wherein the task assembly unit is configured to output a particular task for execution in response to:

the particular task being full;

a new task entry for a new task being ready to be written to the task assembly unit when the task assembly unit does not have available space for a new task entry;

a further task, which has one or more dependencies on the particular task, being due to be executed; or a flush of a rendering queue which includes a primitive to which the particular task relates.

18. A method of rendering an image in a graphics processing system, the method comprising:

storing, in a task assembly unit of the graphics processing system, a plurality of task entries for respective tasks to which computation instances can be allocated, the computation instances being for generating graphics data items for use in rendering the image, wherein a computation instance has one of the following shader types: (i) vertex shader, (ii) hull shader, (iii) domain shader, and (iv) geometry shader, and wherein the task entries are associated with shader types;

allocating, to a task, a computation instance to be executed, based on the shader type of the computation instance;

outputting one or more tasks for execution;

executing computation instances of an outputted task to thereby generate graphics data items for use in rendering the image; and rendering the image using the generated graphics data items.

19. The method of claim 18, wherein said rendering the image comprises:

performing transform operations on graphics data items relating to primitives to be processed for rendering;

applying hidden surface removal to remove primitive fragments which are hidden; and applying one or both of texturing and shading to primitive fragments.

20. A non-transitory computer readable storage medium having stored thereon an integrated circuit definition dataset that, when processed in an integrated circuit manufacturing system, configures the system to manufacture a graphics processing system, said graphics processing system comprising:

a task assembly unit configured to:

store a plurality of task entries for respective tasks to which computation instances can be allocated, the computation instances being for generating graphics data items for use in rendering an image, wherein a computation instance has one of the following shader types: (i) vertex shader, (ii) hull shader, (iii) domain shader, and (iv) geometry shader, and wherein the task entries are associated with shader types, allocate, to a task, a computation instance to be executed, based on the shader type of the computation instance, and output one or more tasks for execution; and processing logic configured to execute computation instances of a task outputted from the task assembly unit to thereby generate graphics data items for use in rendering the image;

wherein the graphics processing system is configured to render the image using the generated graphics data items.

* * * * *